(12) United States Patent
Choi et al.

(10) Patent No.: US 11,853,020 B2
(45) Date of Patent: Dec. 26, 2023

(54) DISPLAY APPARATUS

(71) Applicant: SAMSUNG ELECTRONICS CO., LTD., Suwon-si (KR)

(72) Inventors: Hyunyong Choi, Suwon-si (KR); Weonhee Lee, Suwon-si (KR); Woosung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 439 days.

(21) Appl. No.: 17/132,774

(22) Filed: Dec. 23, 2020

(65) Prior Publication Data
US 2021/0208552 A1 Jul. 8, 2021

(30) Foreign Application Priority Data

Jan. 3, 2020 (KR) .................. 10-2020-0000889

(51) Int. Cl.
| | | |
|---|---|---|
| *G05B 15/02* | (2006.01) | |
| *G01S 17/08* | (2006.01) | |
| *B08B 5/02* | (2006.01) | |
| *B08B 13/00* | (2006.01) | |
| *B08B 1/02* | (2006.01) | |
| *B08B 1/00* | (2006.01) | |
| *G06F 1/16* | (2006.01) | |
| *G08B 5/22* | (2006.01) | |

(52) U.S. Cl.
CPC .............. *G05B 15/02* (2013.01); *B08B 1/002* (2013.01); *B08B 1/02* (2013.01); *B08B 5/02* (2013.01); *B08B 13/00* (2013.01); *G01S 17/08* (2013.01); *G06F 1/1652* (2013.01); *G08B 5/22* (2013.01)

(58) Field of Classification Search
CPC ....... G01S 17/08; G06F 1/1652; G06F 1/3218
See application file for complete search history.

(56) References Cited

U.S. PATENT DOCUMENTS

| | | | | |
|---|---|---|---|---|
| 4,802,541 A | * | 2/1989 | Bator .................. | G01G 7/04 |
| | | | | 177/189 |
| 10,440,900 B1 | * | 10/2019 | Higgins ................ | H05B 47/19 |

(Continued)

FOREIGN PATENT DOCUMENTS

| | | | | |
|---|---|---|---|---|
| DE | 102006036320 A1 | * | 2/2008 | .......... G01S 17/023 |
| KR | 20050037881 A | * | 4/2005 | .............. F24F 11/72 |

(Continued)

OTHER PUBLICATIONS

International Search Report (PCT/ISA/210) issued by the International Searching Authority in International Application No. PCT/KR2020/018889, dated Apr. 5, 2021.

*Primary Examiner* — Vincent H Tran
(74) *Attorney, Agent, or Firm* — Sughrue Mion, PLLC

(57) ABSTRACT

Disclosed herein is a display apparatus. The display apparatus includes a housing, a display configured to protrude out from the housing along a vertical axis, a lifting device configured to raise and to lower the display along the vertical axis with respect to the housing, and a position sensor disposed inside the housing and configured to sense a distance in which an upper portion of the display is moved along the vertical axis. The position sensor includes a first position sensor and a second position sensor spaced apart along a horizontal axis. The first position sensor and the second position sensor simultaneously sense a distance by which the display is raised.

19 Claims, 27 Drawing Sheets

(56) References Cited

U.S. PATENT DOCUMENTS

| | | | |
|---|---|---|---|
| 2012/0200915 A1* | 8/2012 | Kuroi | G03B 21/58 |
| | | | 359/443 |
| 2014/0311995 A1* | 10/2014 | Reimer | B65G 1/10 |
| | | | 211/49.1 |
| 2017/0190515 A1* | 7/2017 | Kuraoka | B25J 13/08 |
| 2018/0118538 A1* | 5/2018 | Latvys | B66F 7/08 |
| 2019/0037710 A1 | 1/2019 | Han | |
| 2019/0037716 A1* | 1/2019 | Kim | H05K 5/0017 |
| 2019/0284033 A1* | 9/2019 | Yamamoto | B66F 9/063 |
| 2019/0297175 A1 | 9/2019 | Lin et al. | |
| 2019/0371214 A1* | 12/2019 | Kim | G09F 11/02 |
| 2021/0118971 A1* | 4/2021 | Wakata | G09G 3/3233 |
| 2022/0206536 A1* | 6/2022 | Chung | G06F 1/1652 |

FOREIGN PATENT DOCUMENTS

| | | |
|---|---|---|
| KR | 10-1383092 B1 | 4/2014 |
| KR | 10-1570869 B1 | 11/2015 |
| KR | 10-1758835 B1 | 7/2017 |
| KR | 10-1773443 B1 | 9/2017 |
| KR | 10-2017-0126061 A | 11/2017 |
| KR | 10-2019-0054430 A | 5/2019 |

* cited by examiner

DISPLAY APPARATUS

CROSS-REFERENCE TO RELATED APPLICATION(S)

This application claims priority to Korean Patent Application No. 10-2020-0000889, filed on Jan. 3, 2020, in the Korean Intellectual Property Office, the disclosure of which is herein incorporated by reference in its entirety.

BACKGROUND

1. Field

The disclosure relates to a display apparatus in which a display panel is configured to protrude out from a housing.

2. Description of Related Art

A display apparatus is a type of output device that visually displays a piece of data information, such as text or graphics, and images.

Recently, development of a flexible display apparatus capable of improving portability or reducing an installation area has been in progress. In particular, in a flexible display apparatus, a rollable-type flexible display apparatus capable of rolling a display panel on which a screen is displayed has been developed.

In this type of display apparatus, the display panel may be maintained in a rolled state in a housing, and the display panel may protrude out from the housing according to a user's need.

As the display panel protrudes out from the housing, there may be a difficulty in that the display panel may be damaged in a process in which the display panel protrudes.

In addition, as the display panel protrudes, a part of the housing is provided to be opened to the outside. Accordingly, foreign substances may flow into the housing, thereby reducing the reliability of the display apparatus.

SUMMARY

Therefore, it is an aspect of the disclosure to provide a display apparatus, configured to protrude, capable of preventing a malfunction of the display apparatus that may occur due to an external factor in response to appearance of a display panel.

It is another aspect of the disclosure to provide a display apparatus, configured to protrude, capable of effectively removing foreign substances flowing into a housing in response to appearance of a display panel.

Additional aspects of the disclosure will be set forth in part in the description which follows and, in part, will be obvious from the description, or may be learned by practice of the disclosure.

In accordance with an aspect of the disclosure, a display apparatus includes a housing, a display configured to protrude out from the housing in a first direction, a lifting device configured to raise and lower the display in the first direction with respect to the housing, and a position sensor disposed inside the housing, and configured to sense a distance in which an upper portion of the display is moved in the first direction. The position sensor includes a first position sensor, and a second position sensor spaced apart in a second direction perpendicular to the first direction. The first position sensor and the second position sensor simultaneously sense a distance by which the display is raised.

The first position sensor and the second position sensor may be provided as an optical sensor.

The display may include a first reflector disposed in an upper portion of the display and disposed at a position corresponding to the first position sensor in the first direction, and a second reflector disposed in an upper portion of the display and disposed at a position corresponding to the second position sensor in the first direction.

The display may further include a flexible display panel on which a screen is displayed in a third direction perpendicular to the first and second directions, and a cap disposed on an upper end of the flexible display panel and configured to support the flexible display panel. The cap may include an extension extending in a direction opposite to the third direction, and the first and second reflectors may be disposed on the extension.

The display apparatus may further include a controller configured to determine an appearance error of the display based on a distance that is obtained by the first position sensor and the second position sensor at predetermined time intervals during the lifting device is driven.

The controller may obtain a first distance between the first position sensor and the first reflector and a second distance between the second position sensor and the second reflector, and in response to the first distance and the second distance being different from each other, the controller may determine that the appearance error of the display occurs.

In response to a protruding distance of the display being less than a predetermined length, the controller may stop driving of the lifting device and display a notification about the appearance error of the display.

In response to the protruding distance of the display being greater than the predetermined length, the controller may stop driving of the lifting device.

The display apparatus may further include a limit sensor configured to detect driving of the lifting device. The lifting device may include a driver, an arm connected to the display to raise and lower the display, and a drive transmission configured to connect the arm to the driver to transmit a driving force to the arm. The drive transmission may be configured to be moved between a first position where the display is moved to be inserted into the housing and a second position where the display is moved to protrude from the housing, and the limit sensor may be configured to detect the first position or the second position of the drive transmission.

The display apparatus may further include a roller arranged in the housing, and configured to allow the display to be rolled or unrolled in the housing in response to the display being raised or lowered, and a rotation sensor arranged in the housing and configured to sense a rotation of the roller.

The display apparatus may further include a controller configured to control the lifting device based on a value sensed by the rotation sensor.

The controller may allow the lifting device to lower the display in response to a sensed value, which is sensed by the rotation sensor during the display is raised by the lifting device, being different from a value that is input to the controller in advance.

The display apparatus may further include a limit sensor configured to detect a third position between the first position and the second position of the drive transmission to determine whether a protruding length of the display corresponds to a predetermined length, and configured to detect a third position between the first position and the second position of the drive transmission.

In response to the protruding length of the display reaching the predetermined length, the controller may stop driving of the lifting device and display a notification about the appearance error of the display.

In response to detecting the third position by the limit sensor, the control may determine that the protruding length of the display reaches the predetermined length.

In response to the protruding distance of the display being greater than the predetermined length, the controller may stop driving of the lifting device.

The display apparatus may further include a dust collection sensor configured to detect foreign substances introduced from the outside, and a controller configured to control a fan to allow a cleaning assembly to be driven based on the detection of the foreign substances by the dust collection sensor.

The controller may control the fan to be driven according to a cycle of operating times of the lifting device.

The control may control the fan to be driven only in response to an off-state of the display.

In accordance with another aspect of the disclosure, a display apparatus includes a housing, a roller arranged inside the housing, a display configured to be rolled or unrolled by the roller, a lifting device configured to be linked to the roller to raise the display to protrude out to the outside of the housing in a first direction, and a position sensor disposed inside the housing, and configured to sense a distance in which an upper portion of the display is moved in the first direction. The position sensor includes a first position sensor, and a second position sensor spaced apart in a second direction perpendicular to the first direction. The first position sensor and the second position sensor simultaneously sense a distance by which the display is raised.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
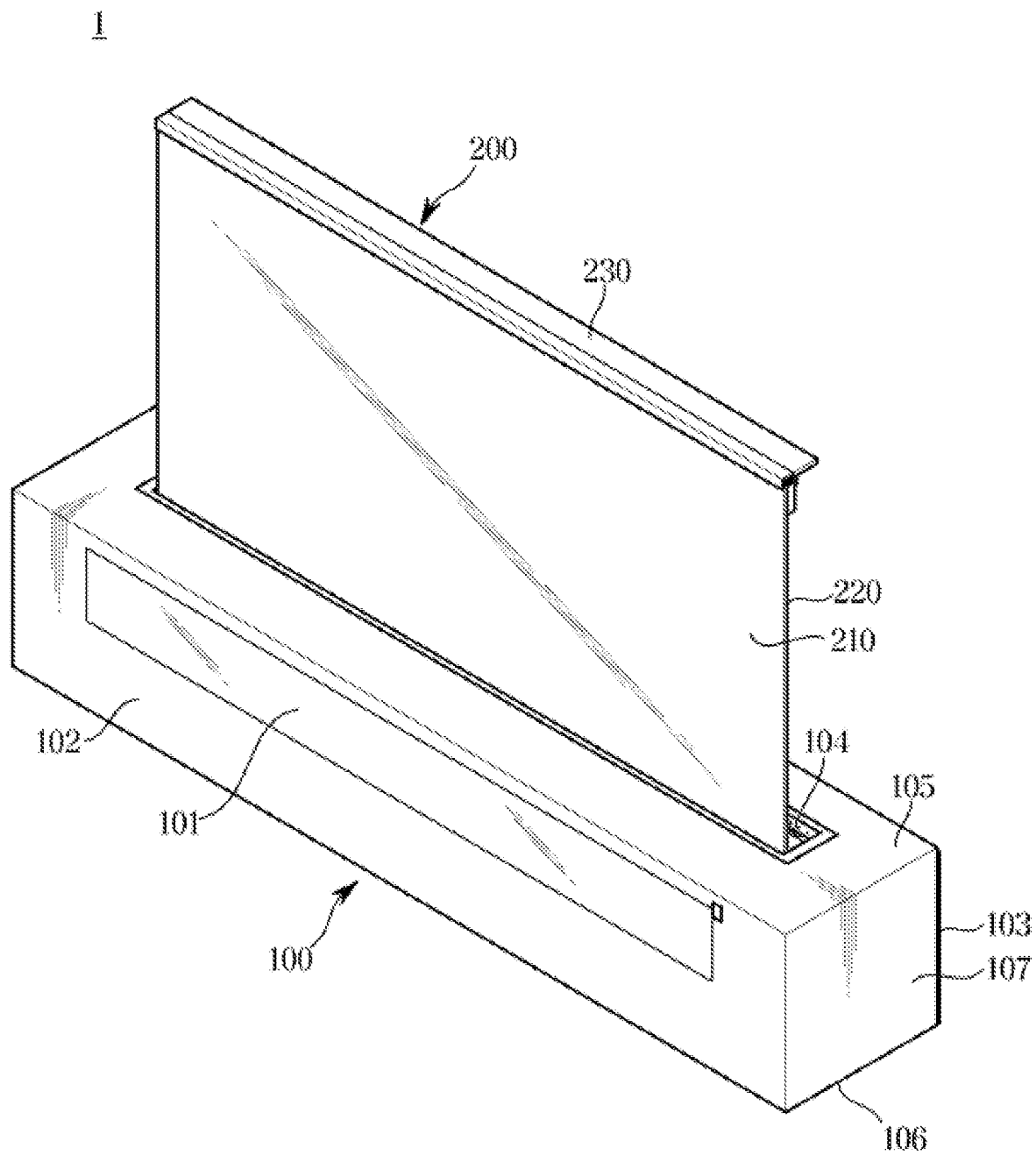
FIG. 1 is a front perspective view illustrating a state in which a display protrudes in a display apparatus according to one or more embodiments of the disclosure.

Embodiments described in the disclosure and configurations shown in the drawings are merely examples of the embodiments of the disclosure, and may be modified in various different ways at the time of filing of the present application to replace the embodiments and drawings of the disclosure.

The singular forms "a," "an" and "the" are intended to include the plural forms as well, unless the context clearly indicates otherwise. For a clear description, the shape and size of the elements may be emphasized in the drawings.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

The disclosure will be described more fully hereinafter with reference to the accompanying drawings.

Figure 2:
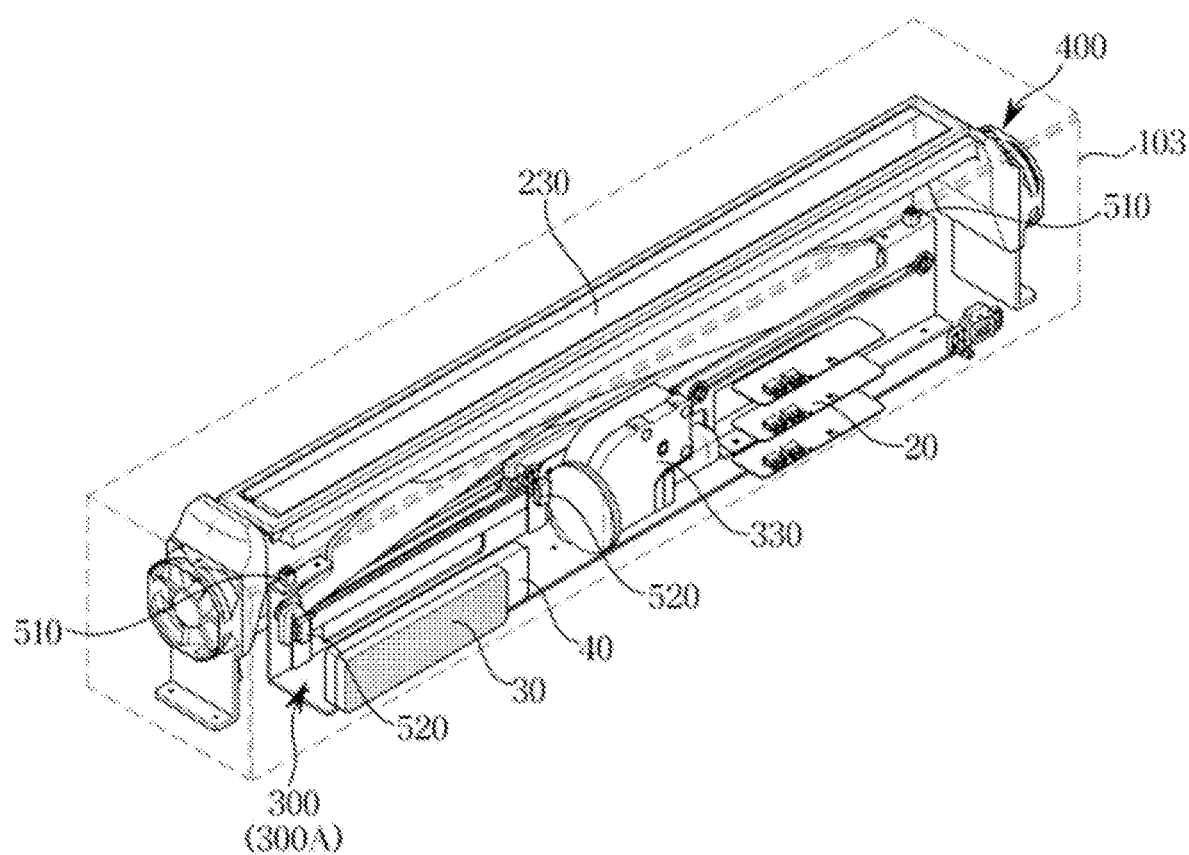
FIG. 2 is a rear perspective view illustrating a state in which the display is inserted into a housing in the display apparatus of FIG. 1.
Figure 3:
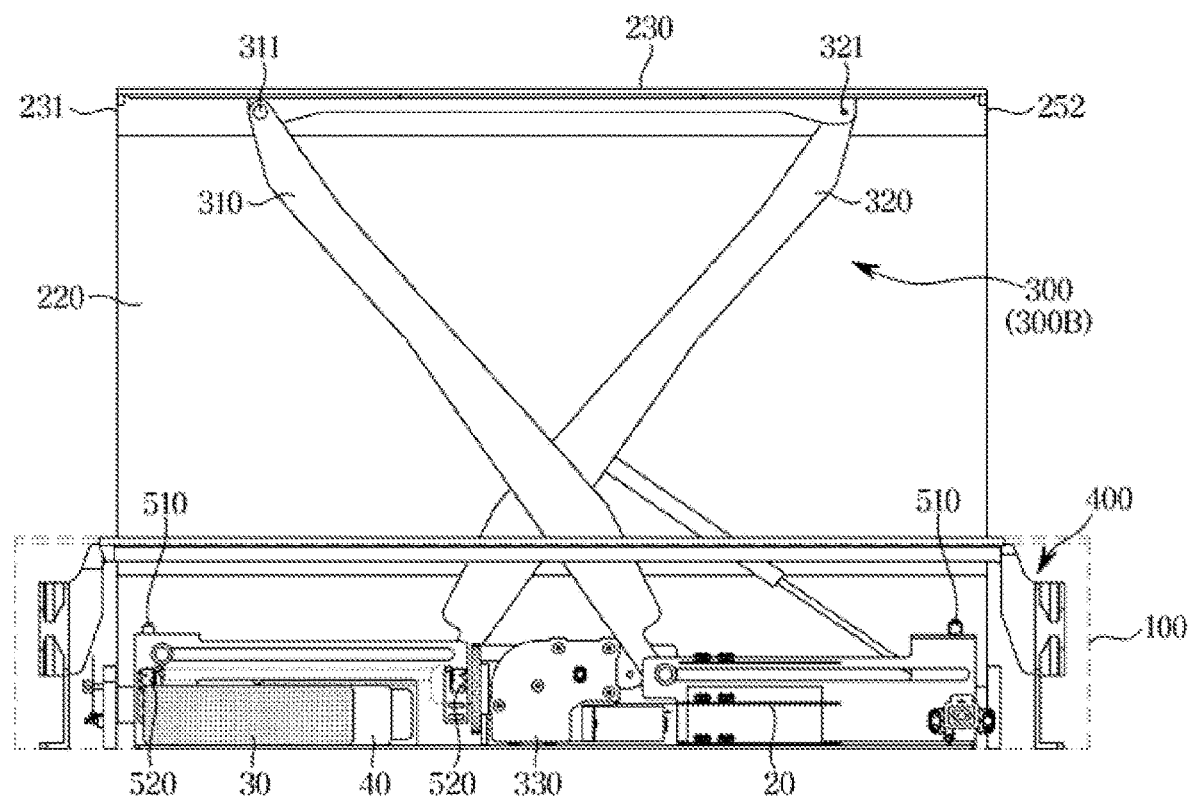
FIG. 3 is a rear view illustrating a state in which the display protrudes in the display apparatus according to one or more embodiments of the disclosure.

FIG. 1 is a front perspective view illustrating a state in which a display protrudes in a display apparatus according to one or more embodiments of the disclosure, FIG. 2 is a rear perspective view illustrating a state in which the display is inserted into a housing in the display apparatus of FIG. 1, along a vertical axis, and FIG. 3 is a rear view illustrating a state in which the display protrudes out of the display apparatus, along the vertical axis, according to one or more embodiments of the disclosure.

A display apparatus 1 is a device configured to display information, materials, data and the like with characters, figures, graphs, images, etc., and TV, personal computer (PC), mobile, and digital signage may be implemented with the display apparatus 1.

As shown in FIGS. 1 to 3, the display apparatus 1 may include a housing 100 and a display 200 configured to protrude out from an inside of the housing 100 to an outside of the housing 100 along the vertical axis.

The housing 100 may include a front surface 102 on which a displaying portion 101 is arranged to display a state of the display apparatus 1 or to receive a signal from a user, and a rear surface 103, the front surface 102 and the rear surface 103 respectively facing a front direction and a rear direction. The rear surface 103 of the housing 100 may be configured to be detachable from the housing 100.

The housing 100 may include an upper surface 105 on which, an opening 104 configured to allow the display 200 to pass through the housing 100 is provided, to allow the display 200 to protrude out from the housing 100, and a lower surface 106 provided to face the upper surface 105 in an up and down direction.

The display 200 may be configured to protrude out in an upper direction of the housing 100 through the opening 104 disposed on the upper surface 105 of the housing 100.

However, the disclosure is not limited thereto, and the display 200 may penetrate the lower surface 106 of the housing 100 and may be configured to protrude out in a downward direction of the housing 100. The opening may be disposed on the lower surface 106 of the housing 106.

The housing 100 may also include side surfaces 107 forming opposite sides of the housing 100.

From a state in which the display 200 is inserted into the housing 100, the display 200 may protrude to the outside of the housing 100 and then exposed to the outside.

After the display 200 is inserted into the housing 100, the display 200 may be folded or rolled in the housing 100, thereby preventing the display 200 from being exposed to the outside.

According to one or more embodiments of the disclosure, the display 200 of the display apparatus 1 may be rolled and inserted into the housing 100. Accordingly, the display 200 rolled in the housing 100 may be unrolled and protrude to the outside of the housing 100, and the display 200 protruding to the outside of the housing 100 may be rolled again and then inserted into the housing 100.

As mentioned above, the display 200 may be configured to protrude out in the up and down direction with respect to the housing 100. The display 200 according to one or more embodiments of the disclosure may protrude upward and be inserted downward with respect to the housing 100, but is not limited thereto. Alternatively, the display 200 may be configured to protrude downward and be inserted upward with respect to the housing 100. In addition, the display 200 may be configured to protrude and be inserted in both directions with respect to the housing 100.

The display 200 may include a display panel 210 configured to display a screen. The display panel 210 may be provided as a flexible display panel 210 configured to be folded or rolled.

The display 200 may include a display cover 220 configured to support the display panel 210. The display cover 220 may support the display panel 210 from a side opposite to a direction in which the display panel 210 displays a screen.

According to one or more embodiments, the display cover 220 may be formed of a plurality of segments partitioned in the up and down direction in which the display 200 protrudes.

Accordingly, the display cover 220 may be configured to be easily rolled together with the display panel 210. During the display 200 is rolled in the housing 100, the display cover 220 may be rolled together with the display panel 210. During the display cover 220 is rolled, a gap between the plurality of segments may be increased and thus the display cover 220 may be easily rolled.

The display apparatus 1 may include a roller 10 (refer to FIG. 6) configured to allow the display panel 210 and the display cover 220 to be easily rolled.

In response to the roller 10 being rotated in one direction, the display 200 may be unrolled and protrude from the housing 100. In response to the roller 10 being rotated in the opposite direction, the display 200 may be rolled and then inserted into the housing 100.

The roller 10 may include a driver configured to transmit a rotational force of the roller 10.

The display 200 may include a cap 230 configured to support the display panel 210 and the display cover 220.

The cap 230 may be configured to fix the display panel 210 and the display cover 220 to allow the display panel 210 and the display cover 220 to move integrally in response to appearance of the display 200.

The cap 230 may be disposed on an upper end of the display 200.

As will be described later, the cap 230 may be coupled to a lifting device 300 configured to raise and lower the display 200 to allow the display 200 to be raised and lowered in the up and down direction.

The cap 230 may have a size corresponding to the opening 104. In response to the display 200 being completely inserted into the housing 100, an upper surface of the cap 230 may be disposed at a height corresponding to the upper surface 105 of the housing 100 in the up and down direction.

Accordingly, in response to the display 200 being completely inserted into the housing 100, the opening 104 may be closed by the cap 230. Because the upper surface of the cap 230 and the upper surface 105 of the housing 100 are disposed at substantially corresponding heights, the cap 230 and the housing 100 may form a sense of unity.

However, the disclosure is not limited thereto, and the cap 230 may be configured to be inserted into the opening 104 in response to the display 200 being completely inserted into the housing 100. The housing 100 may further include an additional cover configured to cover the opening 104.

The display apparatus 1 may include the lifting device 300 configured to raise and lower the display 200 to allow the display 200 to protrude out from the housing 100.

The lifting device 300 may disposed inside the housing 100 and in response to the display 200 protruding to the outside of the housing 100, the lifting device 300 together with the display 200 may pass through the opening 104 and then protrude to the outside of the housing 100. Technical characteristics of driving of the lifting device 300 will be described later in detail.

The display apparatus 1 may include a controller 20 electrically connected to the display 200, the lifting device 300, and various sensors arranged in the housing 100.

The controller 20 may be disposed inside the housing 100. The controller 20 may include a plurality of substrates including a main substrate electrically connected to the display panel 210, a driver 330 of the lifting device 300, and various sensors 510, 520, and 530.

The controller 20 may include a processor configured control various electronic components constituting the display apparatus 1. Accordingly, the controller 20 may provide control signals to various electronic components of the display apparatus 1.

The controller 20 may be connected to a power supply device configured to receive power from the outside of the display apparatus 1.

The controller 20 may control the display panel 210. In addition, the controller 20 may control the lifting device 300 according to a sensed value sensed from various sensors 510, 520, and 530, which will be described later.

The display apparatus 1 may include a speaker 30, and a battery 40 configured to supply electricity, which is separated from the power supply device to the controller 20. Each of the components may be disposed inside the housing 100.

The display apparatus 1 may include a cleaning assembly 400 configured to discharge foreign substances, which flow into the housing 100 through the opening 104, to the outside of the housing 100, which will be described later.

The lifting device 300 may include first and second arms 310 and 320 connected to the display 200, and the driver 330 configured to transmit a driving force to the first and second arms 310 and 320 to allow the first and second arms 310 and 320 to be operated.

One end 311 of the first arm 310 and one end 321 of the second arm 320 may be rotatably connected to the cap 230, respectively.

The first and second arms 310 and 320 may be configured to be moved in the up and down direction by drive transmissions 340 and 350, which is to be described later, by driving of the driver 330.

In response to the first and second arms 310 and 320 being moved upward, the cap 230 connected to the ends 311 and 321 of the first and second arms 310 and 320 may be moved upward by being linked to the first and second arms 310 and 320, and in response to the first and second arms 310 and 320 being moved downward, the cap 230 may be moved downward by being linked to the first and second arms 310 and 320.

In response to the movement of the cap 230, the display 200 may be moved in the up and down direction.

The first and second arms 310 and 320 may be moved downward by the driver 330 as shown in FIG. 2 and disposed at a first position 300A inserted into the housing 100.

The first position 300A refers to a position in which the end 311 and 321 of the first and second arms 310 and 320 are lowered to the minimum height and cannot be further lowered. In response to the first and second arms 310 and 320 being disposed at the first position 300A, the cap 230 may be disposed at a position to close the opening 104, and the upper surface 105 and the cap 230 may be disposed at the same height.

In addition, the first and second arms 310 and 320 may be moved upward by the driver 330 to pass through the housing 100 and then moved upward and thus the ends 311 and 321 of the first and second arms 310 and 320 may be disposed at a second position 300B disposed on the outside of the housing 100.

The second position 300B refers to a position in which the ends 311 and 321 of the first and second arms 310 and 320 are raised to the maximum height and cannot be raised higher. In response to the first and second arms 310 and 320 being disposed in the second position 300B, the display 200 may protrude to a maximum height.

As the first and second arms 310 and 320 are moved between the first position 300A and the second position 300B, the display 200 may be configured to protrude out from and retract into the housing 100 by being linked to the movement of the first and second arms 310 and 320.

As mentioned above, the display 200 may be rolled and inserted into the housing 100. The first and second arms 310 and 320 of the lifting device 300 may be disposed at the first position 300A.

In response to the lifting device 300 being driven, the first and second arms 310 and 320 may be moved upward, and accordingly, the cap 230 may be moved upward.

Because the cap 230 is disposed on the upper end of the display 200, the upper end of the display 200 may be moved upward together with the first and second arms 310 and 320.

The display 200 rolled in the housing 100 may be released due to the movement of the upper end of the display 200, and then the display 200 may be unrolled. A lower end of the display 200 may be connected to the roller 10.

The upper end of the display 200 may pass through the housing 100 and protrude to the outside of the housing 100 by the lifting device 300, and the upper end of the display 200 may be moved upward together with the ends 311 and 321 of the first and second arms 310 and 320 until the first and second arms 310 and 320 are disposed at the second position 300B.

In response to the first and second arms 310 and 320 being disposed at the second position 300B, the driving of the lifting device 300 may be terminated and the display 200 may protrude to the outside of the housing 100 in an unrolled state. The display cover 220 may support the display panel 210 to allow the display panel 210 to be unrolled and flat.

Hereinafter the driving of the lifting device 300 will be described in detail.

Figure 4:
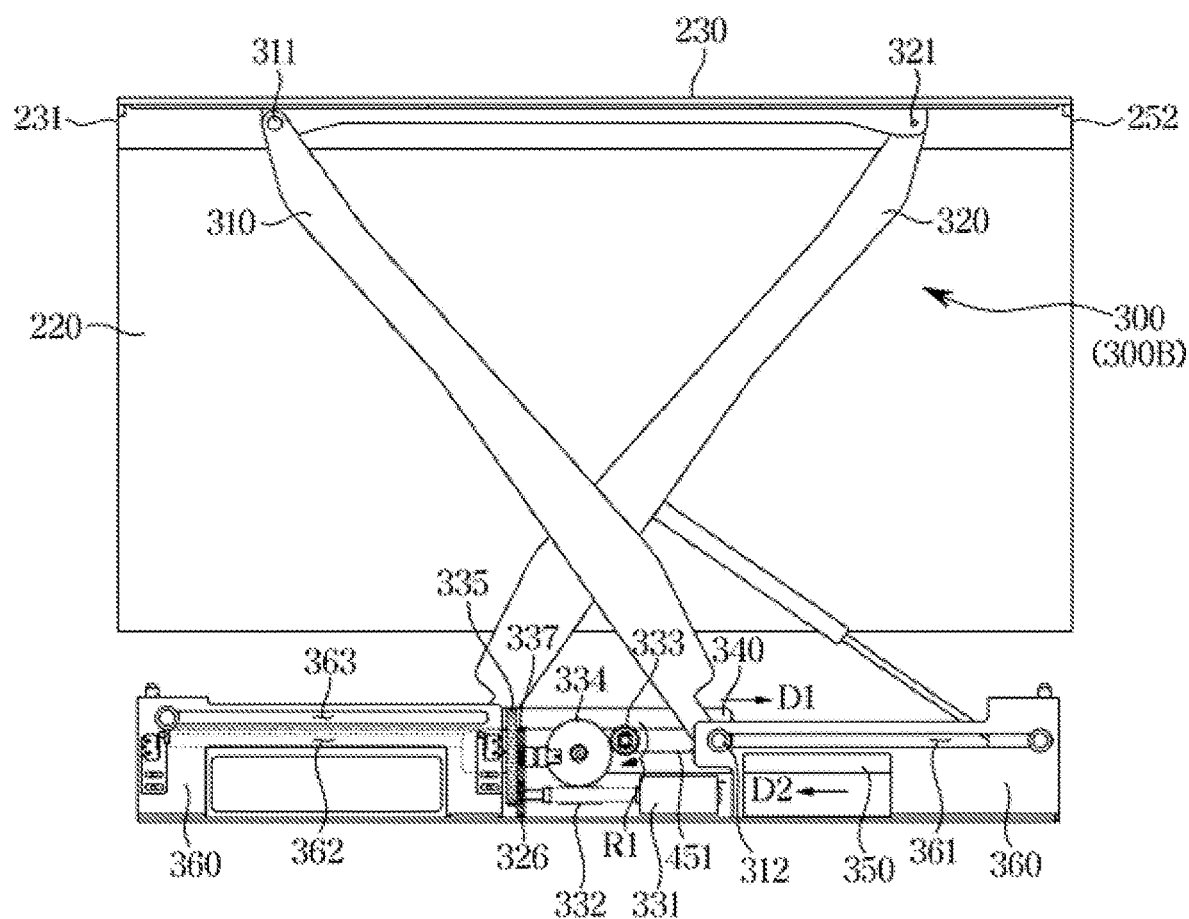
FIG. 4 is a view illustrating one or more configurations in a state in which the display protrudes in the display apparatus according to one or more embodiments of the disclosure.
Figure 5:
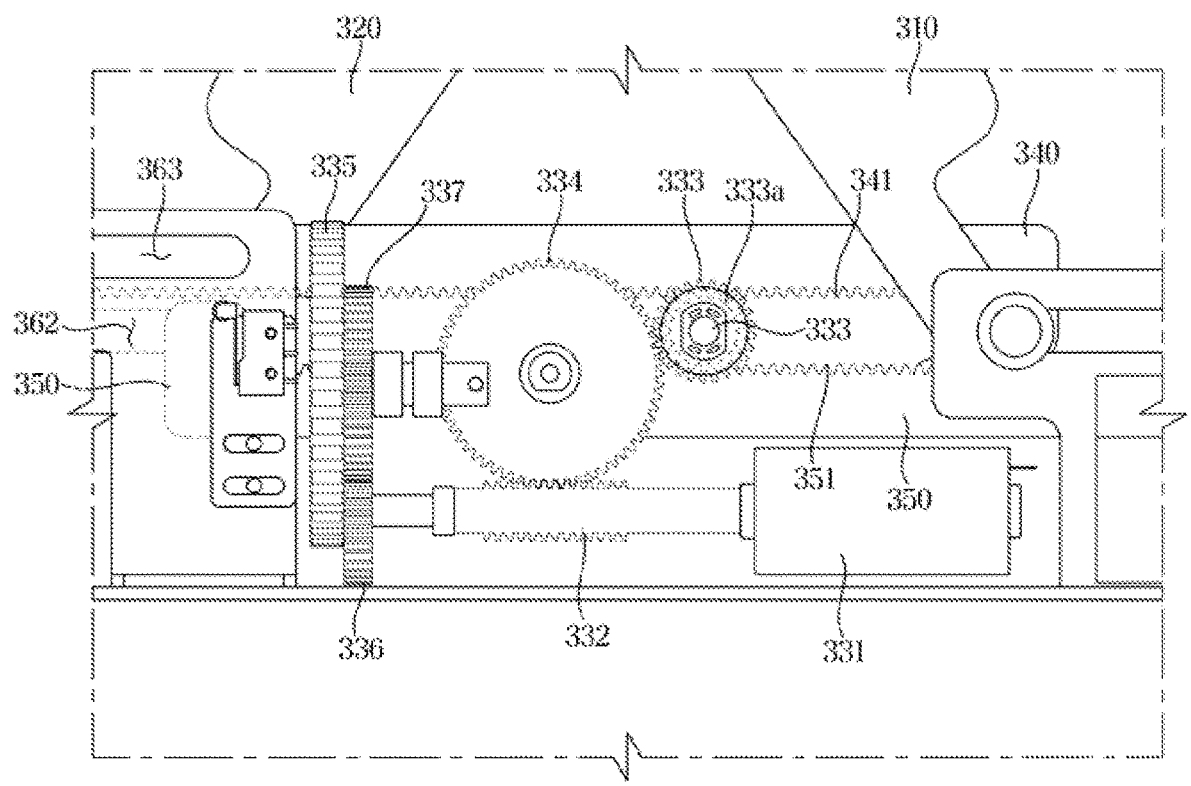
FIG. 5 is an enlarged view of one or more configurations of FIG. 4.
Figure 6:
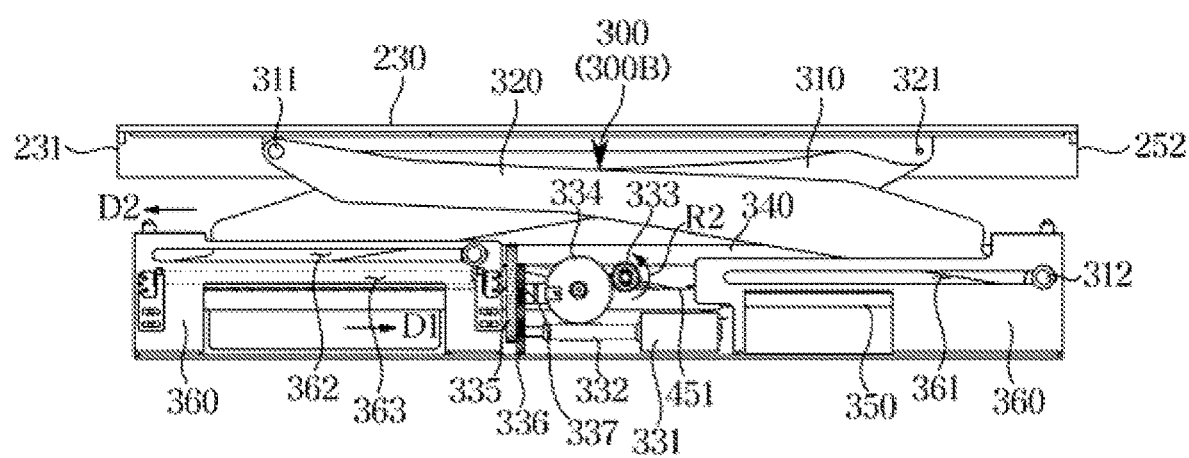
FIG. 6 is a view illustrating one or more configurations in a state in which the display is inserted in the display apparatus according to one or more embodiments of the disclosure.

FIG. 4 is a view illustrating one or more configurations in a state in which the display protrudes in the display apparatus according to one or more embodiments of the disclosure, FIG. 5 is an enlarged view of one or more configurations of FIG. 4, and FIG. 6 is a view illustrating one or more configurations in a state in which the display is inserted in the display apparatus according to one or more embodiments of the disclosure.

As shown in FIG. 4, the lifting device 300 may include a first drive transmission 340 configured to connect the first arm 310 to the driver 330 and configured to transmit a rotational force generated by the driver 330 to the first arm 310.

The lifting device 300 may include a second drive transmission 350 configured to connect the second arm 320 to the driver 330 and configured to transmit a rotational force generated by the driver 330 to the second arm 320.

The driver 330 may include a motor 331 configured to generate a rotational force, a motor-side gear 332 connected to the motor 331, and a transmission member 333 configured to transmit a rotational force to the first and second drive transmission 340 and 350.

The driver 330 may include an intermediate gear 334 disposed between the motor-side gear 332 and the transmission member 333 and configured to connect the motor-side gear 332 to the transmission member 333. However, the disclosure is not limited thereto, and the motor-side gear 332 and the transmission member 333 may be directly connected to each other.

The motor-side gear 332 may be provided as a worm gear, and the intermediate gear 334 may be provided as a worm wheel and configured to be engaged with the motor-side gear 332. The transmission member 333 may include a first engaging portion 333a to be engaged with the intermediate gear 334.

In response to the motor 331 being rotated in one direction, the transmission member 333 may finally be rotated in one direction R1 that is a direction perpendicular to one direction of the motor 331, and in response to the motor 331 being rotated in an opposite direction, the transmission member 333 may be rotated in a direction R2 that is a direction opposite to one direction of the motor 331. Accordingly, the transmission member 333 may transmit the power to the first and second drive transmissions 340 and 350.

The first and second drive transmissions 340 and 350 may be coupled to the transmission member 333 by a rack and pinion mechanism.

The transmission member 333 may include a second engaging portion 333b configured to serve as a pinion engaged with the first and second drive transmissions 340 and 350. The first engaging portion 333a and the second engaging portion 333b may be horizontally disposed in the front and rear direction.

The driver 330 may include a manual wheel 335, a wheel gear 337 connected to the manual wheel 335, and an auxiliary gear 337 configured to connect the wheel gear 337 to the more-side gear 332, which are provided to rotate the transmission member 333 by an external force rather than the rotational force of the motor.

The first drive transmission 340 may include a first rack 341 engaged with the second engaging portion 333b. The second drive transmission 350 may include a second rack 351 engaged with the second engaging portion 333b.

The first drive transmission 340 may be provided to allow the other end 312 of the first arm 310 to be rotatably coupled thereto. The second drive transmission 350 may be provided to allow the other end 322 of the second arm 320 to be rotatably coupled thereto.

The first rack 341 of the first drive transmission 340 is coupled to the second engaging portion 333b of the transmission member 333 by the rack and pinion mechanism. In response to the transmission member 333 being rotated in one direction R1 or in the opposite direction R2, the first drive transmission 340 may be linked to the rotation of the transmission member 333 and translated in a first direction D1 or a second direction D2.

The second rack 351 of the second drive transmission 350 is coupled to the second engaging portion 333b of the transmission member 333 by the rack and pinion mechanism. In response to the transmission member 333 being rotated in one direction R1 or in the opposite direction R2, the second drive transmission 350 may be linked to the rotation of the transmission member 333 and translated in the second direction D2 or the first direction D1.

The first drive transmission 340 and the second drive transmission 350 may be translated in different directions by the one direction-rotation of the transmission member 333.

The lifting device 300 may include a bracket 360 disposed in the inside of the housing 100. The bracket 360 may be provided to allow the first and second drive transmissions 340 and 350 and the first and second arms 310 and 320 to be movably coupled to the bracket 360.

The bracket 360 may include a first slit 361 provided to allow a part of the first drive transmission 340 to be inserted thereto to movably constrain the first drive transmission 340 and to guide the translational movement of the first drive transmission 340.

The bracket 360 may include a second slit 362 provided to allow a part of the second drive transmission 350 to be inserted thereto to movably constrain the second drive transmission 350 and to guide the translational movement of the second drive transmission 350.

The first and second slits 361 and 362 may be provided to extend toward the first and second directions D1 and D2, respectively.

The other end 312 of the first arm 310 may be provided to be rotatably coupled to the first drive transmission 340 on the first slit 361, approximately in the up and down direction.

The other end 322 of the second arm 320 may be provided to be rotatably coupled to the second drive transmission 350 on the second slit 362, approximately in the up and down direction.

The first drive transmission 340 may be linked to the rotation of the transmission member 333 and guided by the first slit 361, thereby being translated in the first direction D1 and the second direction D2. The first arm 310 coupled to the first drive transmission 340 may be moved in the up and down direction by being linked to the movement of the first drive transmission 340.

The other end 312 of the first arm 310 may be linked to the movement of the first drive transmission 340, thereby being translated, and at the same time, the other end 312 of the first arm 310 may be rotated in one direction or the opposite direction with respect to the first drive transmission 340. Accordingly, the one end 311 of the first arm 310 may be moved in the up and down direction.

The second drive transmission 350 may be linked to the rotation of the transmission member 330 and guided by the second slit 362, thereby being translated in the first direction D1 and the second direction D2. The second arm 320 coupled to the second drive transmission 350 may be moved in the up and down direction by being linked to the movement of the second drive transmission 350.

The other end 322 of the second arm 320 may be linked to the movement of the second drive transmission 350, thereby being translated, and at the same time, the other end 322 of the second arm 320 may be rotated in one direction or the opposite direction with respect to the second drive transmission 350. Accordingly, the one end 321 of the second arm 320 may be moved in the up and down direction.

As shown in FIGS. 4 and 5, in response to the transmission member 333 of the driver 330 being rotated in the first direction R1 in a state in which the first and second arms 310 and 320 are arranged at the second position 300B, the first drive transmission 340 may be linked to the rotation of the transmission member 333 and then moved in the first direction D1, and the second drive transmission 350 may be linked to the rotation of the transmission member 333 and then moved in the second direction D2.

The other end 312 of the first arm 310 coupled to the first drive transmission 340 may be moved in the first direction D1 while being rotated by being linked to the movement of the first drive transmission 340. Accordingly, the one end 311 of the first arm 310 may be moved downward by being linked to the movement of the other end 312.

The other end 322 of the second arm 320 coupled to the second drive transmission 350 may be moved in the second direction D2 while being rotated by being linked to the movement of the second drive transmission 350. Accordingly, the one end 321 of the second arm 320 may be moved downward by being linked to the movement of the other end 322.

As mentioned above, because the cap 230 is coupled to the one ends 311 and 321 of the first and second arms 310 and 320, the cap 230 may be moved downward by being linked to the movement of the first and second arms 310 and 320.

The first and second arms 310 and 320 may be linked to the movement of the first drive transmission 340 moving in the first direction D1 and the second drive transmission 350 moving in the second direction D2, respectively, and thus the first and second arms 310 and 320 may be moved to a direction in which the first and second arms 310 and 320 are laid down in the up and down direction.

The one end 311 of the first arm 310 may be disposed adjacent to an end 231 of the cap 230 in the second direction D2, and the one end 321 of the second arm 320 may be disposed adjacent to an end 232 of the cap 230 in the first direction D1.

Accordingly, in response to the other end 312 of the first arm 310 being moved in the first direction D1 and the other end 322 of the second arm 320 being moved in the second direction D2, the first and second arms 310 and 320 may be provided to be laid down toward the lower side.

As the transmission member 333 is rotated in the first direction R1, the ends 311 and 321 of the first and second arms 310 and 320 may continuously be moved downward, respectively, and the first and second arms 310 and 320 may be disposed at the first position 300A, as shown in FIG. 6.

As described above, in response to the first and second arms 310 and 320 being disposed at the first position 300A, the first and second arms 310 and 320 may be inserted into the housing 100 and the display 200 may be inserted into the housing 100 by being linked to the insertion of the first and second arms 310 and 320.

In response to the transmission member 333 being rotated in the opposite direction R2 in a state in which the first and second arms 310 and 320 are disposed at the first position 300A, the first drive transmission 340 may be moved in the second direction D2, and the second drive transmission 350 may be moved in the first direction D1.

The first and second arms 310 and 320 may be linked to the first and second drive transmissions 340 and 350, respectively, and the other ends 312 and 322 of the first and second arms 310 and 320 may be moved in the second direction D2 and the first direction D1, respectively, and thus the first and second arms 310 and 320 may be erected.

As the other ends 312 and 322 of the first and second arms 310 and 320 are moved in the second direction D2 and the first direction D1, respectively, the first and second arms 310 and 320 may be disposed at the second position 300B, again as illustrated in FIG. 4, and then the display 200 may protrude to the outside of the housing 100.

The controller 20 may control the driver 330 to allow the transmission member 333 to be rotated in the one direction R1 or in the opposite direction R2. Accordingly, the lifting device 300 may be moved in the up and down direction and the display 200 may be configured to protrude out from the housing 100 by the lifting device 300.

The display 200 may be maintained in a state of being inserted into the housing 100 while the display apparatus 1 is not driven.

The controller 20 may control the driver 330 to allow the transmission member 333 to be rotated in the opposite direction R2 in response to a signal for driving the display apparatus 1 input by a user.

Accordingly, in response to the first and second arms 310 and 320 being disposed in the second position 300B, the controller 20 may control the driver 330 to allow the driving of the driver 330 to be terminated. When a height of the display 200 protruding from the upper surface 105 of the housing 300 is h, the display 200 may reach various heights h according to a drive mode of the display apparatus 1, and the controller 20 may control the driver 330 based on the received drive mode of the display apparatus 1.

In response to a signal for terminating the driving of the display apparatus 1 input by a user, the controller 20 may control the driver 330 to allow the transmission member 333 to be rotated in the one direction R1.

Accordingly, the first and second arms 310 and 320 may be moved downward until the first and second arms 310 and 320 are moved to the first position 300A, and in response to the first and second arms 310 and 320 being disposed at first position 300A, the controller 20 may control the driver 330 to terminate the driving of the driver 330.

Hereinafter a position sensor 510 of the display apparatus 1 configured to detect appearance of the display 200 will be described in detail.

Figure 7:
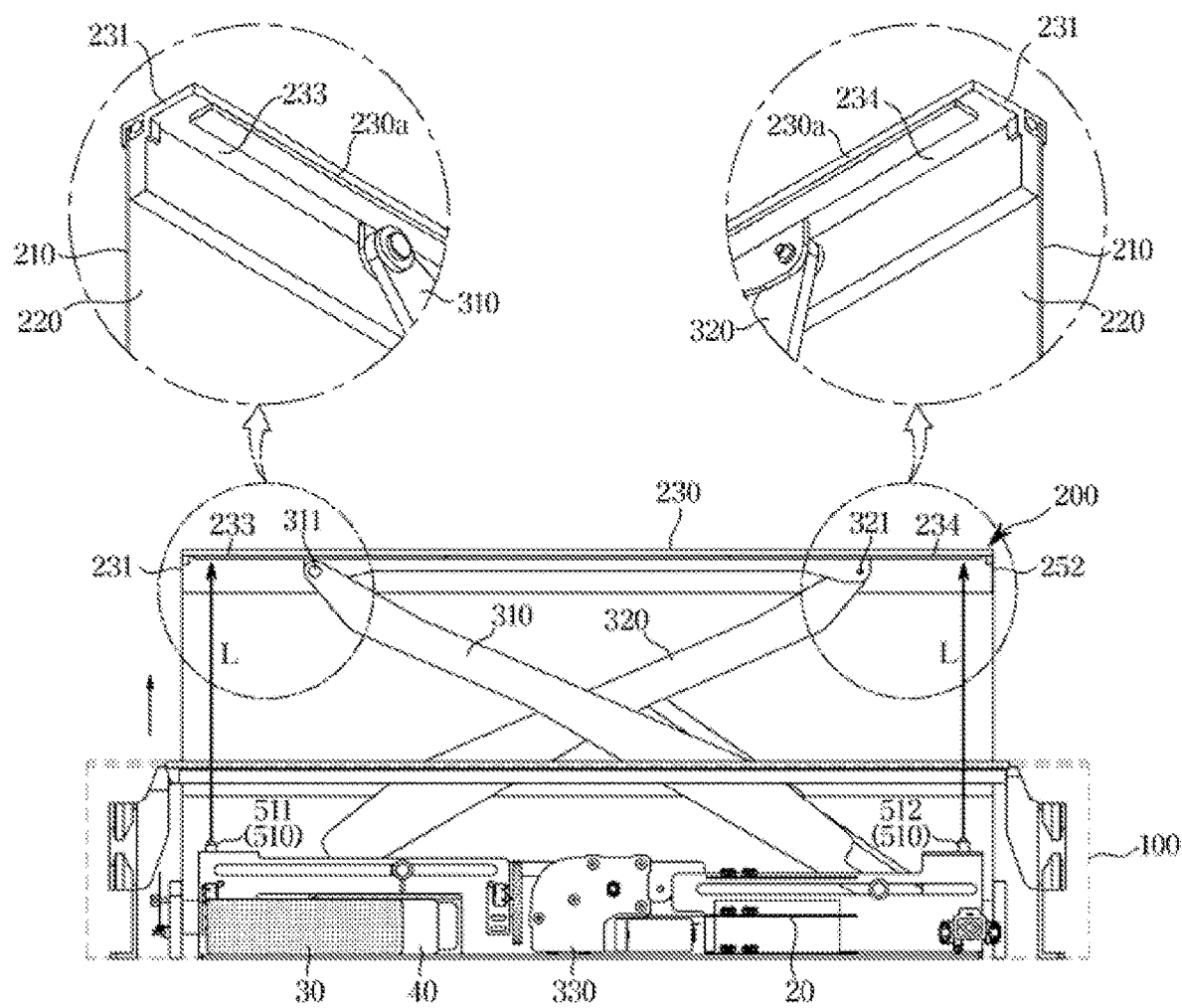
FIG. 7 is a view illustrating a state in which the display protrudes in the display apparatus according to one or more embodiments of the disclosure.
Figure 8:
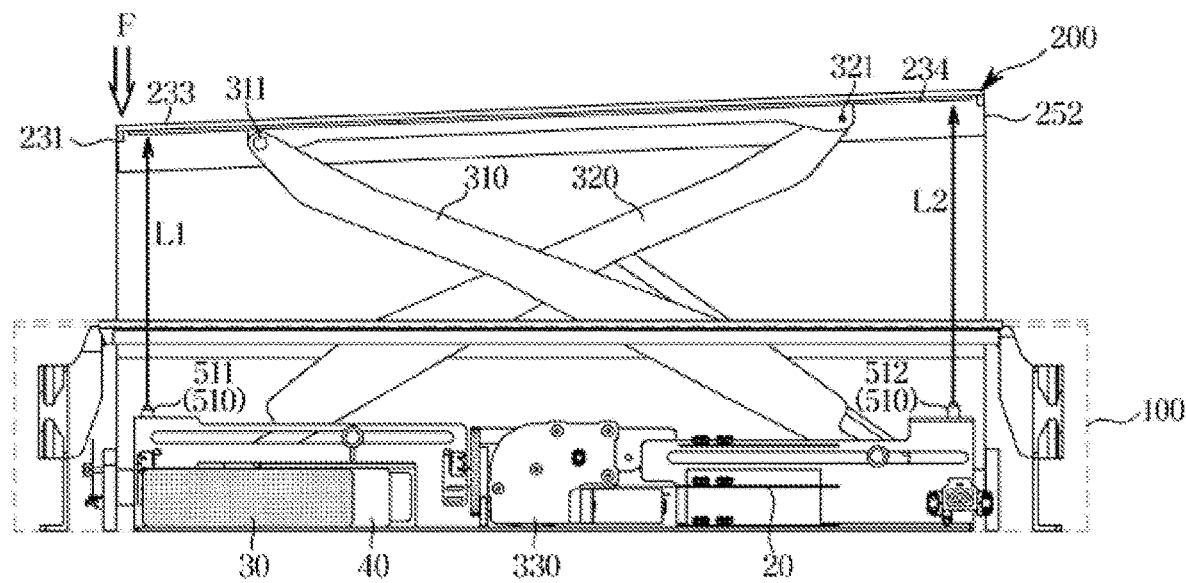
FIG. 8 is a view illustrating a state in which the display has a malfunction in the display apparatus according to one or more embodiments of the disclosure.

FIG. 7 is a view illustrating a state in which the display protrudes in the display apparatus according to one or more embodiments of the disclosure, and FIG. 8 is a view illustrating a state in which the display has a malfunction in the display apparatus according to one or more embodiments of the disclosure.

As mentioned above, the display 200 may be moved in the up and down direction by being linked to the lifting device 300.

In response to the appearance of the display 200 in a state in which the upper end of the display 200 is not horizontal in a left and right direction, stress may be generated in the display panel 210 and the display panel 210 may be damaged.

To prevent damage, the lifting device 300 may be configured to allow the ends 311 and 312 of the first and second arms 310 and 320 to be raised at the same height. The first and second drive transmissions 340 and 350 may be moved at the same distance through the rotation of a single motor 331 and accordingly, a rising distance of the ends 311 and 312 of the first and second arms 310 and 320 may be the same in the up and down direction.

Therefore, the cap 230 connected to the ends 311 and 312 of the first and second arms 310 and 320 may be raised while maintaining a horizontal state in the left and right direction, and the display 200 may protrude out from the housing 100 while maintaining a horizontal state.

However, in response to applying a physical external force to the display 200 while the display 200 protrudes or inserted, the display 200 may be moved in the up and down direction in a non-horizontal state and thus the display 200 may be damaged.

For example, in response to the display 200 being raised or lowered in a state in which an object is disposed on the upper side of the display 200, or in response to suddenly applying an external force to the upper side of the display 200 being raised or lowered, the display panel 210 may be damaged because the display 200 is raised or lowered without a horizontal position.

In response to applying an external force to the display 200 being raised, it is difficult to continuously maintain the horizontal position of the display 200 while the display 200 is raised, and thus the display panel 210 may be damaged. Conversely, in response to applying an external force to the display 200 being lowered, the display 200 may be inserted into the housing 100 and the transmission of the external force may be terminated, thereby reducing the risk of damage to the display panel 210.

In addition, it may be difficult in that the lifting device 300 configured to raise and lower the display 200 may be damaged by an external force transmitted to the display 200.

To alleviate such difficulty, the display apparatus 1 may include a position sensor 510 configured to sense whether the display 200 maintains a horizontal state during the display 200 is raised.

The position sensor 510 may detect whether the display 200 is horizontally raised in the left and right direction. In response to the display 200 being raised in the non-horizontal state in the left and right direction due to an external force generated in a process of raising the display 200, the position sensor 510 may detect the non-horizontal state of the display 200.

The position sensor 510 may transmit a sensed value to the controller 20. The controller 20 receiving such a sensed value may control the driver 330 to stop the driving of the lifting device 300.

After controlling the driver 330 to stop the driving of the lifting device 300, the controller 20 may control the driver 330 to rotate the motor 331 to the opposite direction to allow the lifting device 300 to lower the display 200.

Therefore, the display 200, which is raised in the non-horizontal state, may be lowered again and then inserted into the housing 100. As the display 200 is inserted into the housing 100, the external force applied to the display 200 may disappear and thus the damage to the display 200 may be prevented.

Further, in the process in which the display 200 is lowered again caused by the external force generated in the display 200 or after the display 200 is inserted into the housing 100, the controller 20 may control the displaying portion 11 to display an error signal of the driving of the display 200.

Through the display portion 11, a user may recognize that an external force is transmitted to the display 200 and then input a signal to the display apparatus 1, and the controller 20 may control the lifting device 300 to raise the display 200 again.

As shown in FIG. 7, the position sensor 510 may be provided with a first position sensor 511 and a second position sensor 512. However, the disclosure is not limited thereto, and three or more position sensors 510 may be provided.

When it is assumed that the end 231 of the cap 230 in the second direction D2 is a first end 231 and the end 232 in the first direction D1 is a second end 232, the first position sensor 511 may be disposed adjacent to the first end 231 in the left and right direction, and the second position sensor 512 may be disposed adjacent to the second end 232.

The first position sensor 511 and the second position sensor 512 may be spaced apart from each other in the left and right directions (i.e., along a horizontal axis). It may be appreciated that the first and second position sensors 511 and 512 are close to the first end 231 and the second end 232, respectively.

The position sensor 510 may be provided as an optical sensor. The position sensor 510 may sense a distance of an object by emitting light and collecting reflected light. However, the disclosure is not limited thereto, and the position sensor 510 may be provided with another type of sensor configured to measure a height of the first end 231 and the second end 232 of the cap 230.

The first and second position sensors 511 and 512 may be configured to emit light in the upward direction.

The first and second position sensors 511 and 512 may be configured to receive light that is emitted from the first and second position sensors 511 and 512 and then reflected by the cap 230.

The cap 230 may include a first reflector 233 disposed at a position corresponding to the first position sensor 511 in the up and down direction. The cap 230 may include a second reflector 234 disposed at a position corresponding to the second position sensor 512 in the up and down direction.

The first and second reflectors 233 and 234 may be regions in which light emitted from the first and second position sensors 511 and 512 is reflected, respectively, and may be formed as a part of the cap 230.

The first and second reflectors 233 and 234 may be provided as a part of a plate shape extending from the cap 230 in a rearward direction with respect to the front and rear direction.

The first and second reflectors 233 and 234 may be provided as a part of a plate shape that is horizontal in the front and rear direction. The first and second reflectors 233 and 234 may be provided in a shape of a surface facing the lower side, respectively. Accordingly, the first and second reflectors 233 and 234 may be provided to face the first and second position sensors 511 and 512, respectively. The first and second reflectors 233 and 234 may be provided to face the opening 104 of the housing 100.

The cap 230 may include an extension 230a extending in a direction opposite to a direction in which the display panel 210 displays a screen. The extension 230a may be provided in a plate shape extending in a direction perpendicular to a direction in which the display 200 is raised and lowered.

The first and second reflectors 233 and 234 may be disposed on a lower surface of the extension 230a, respectively.

The first and second position sensors 511 and 512 may emit light to the first and second reflectors 233 and 234 through the opening 104 formed in the upper surface 105 of the housing 100.

Accordingly, the first and second position sensors 511 and 512 may sense a distance between the first and second reflectors 233 and 234 and the first and second position sensors 511 and 512, respectively.

Because the display 200 is horizontally raised and lowered in a state in which the external force is generated in the display 200, the first and second position sensors 511 and 512 may sense the same distance L, respectively.

A distance L from the first position sensor 511 to the first reflector 233 and a distance L from the second position sensor 512 to the second reflector 234 may be the same because the display 200 is horizontally raised and lowered.

During the lifting device 300 is operated, the first and second position sensors 511 and 512 may continuously transmit the distance L from the first position sensor 511 to the first reflector 233 and the distance L from the second position sensor 512 to the second reflector 234 to the controller 20.

In response to receiving the same distance that is sensed by the first and second position sensors 511 and 512, the controller 20 may control the lifting device 300 to maintain the driving of the lifting device 300.

However, as illustrated in FIG. 8, in response to transmitting an external force F to a part adjacent to the first end 231, the horizontal state of the display 200 may be terminated. In response to transmitting an external force F during the display 200 is raised, the display 200 may be raised in the non-horizontal state, and the display panel 210 or the lifting device 300 may be damaged, as described above.

A distance L1 between the first position sensor 511 and the first reflector 233 sensed by the first position sensor 511 and a distance L2 between the second position sensor 512 and the second reflector 234 sensed by the second position sensor 512 may be sensed differently.

The first and second position sensors 511 and 512 may transmit differently sensed distances L1 and L2 to the controller 20. In response to receiving a sensed value for the distances L1 and L2 sensed differently, the controller 20 may control the lifting device 300 to lower the display 200.

It may be appreciated that the first position sensor 511 and the second position sensor 512 may be disposed at the same height in the up and down direction.

However, the disclosure is not limited thereto, and the first position sensor 511 and the second position sensor 512 may be disposed at different heights in the up and down direction. Even if the first and second ends 231 and 232 are horizontally raised and lowered, the first position sensor 511 and the second position sensor 512 may sense different distances, respectively. Even when different height values are sensed by the first position sensor 511 and the second position sensor 512, the controller 20 may calculate a distance by correcting the sensed height value.

The first and second position sensors 511 and 512 may be disposed on the bracket 360, respectively. However, the disclosure is not limited thereto, and the first and second position sensors 511 and 512 may be fixed to the inside of the housing 100 by an additional configuration disposed inside the housing 100.

Hereinafter a rotation sensor 520 configured to detect a rotation of the roller 10 will be described in detail.

Figure 9:
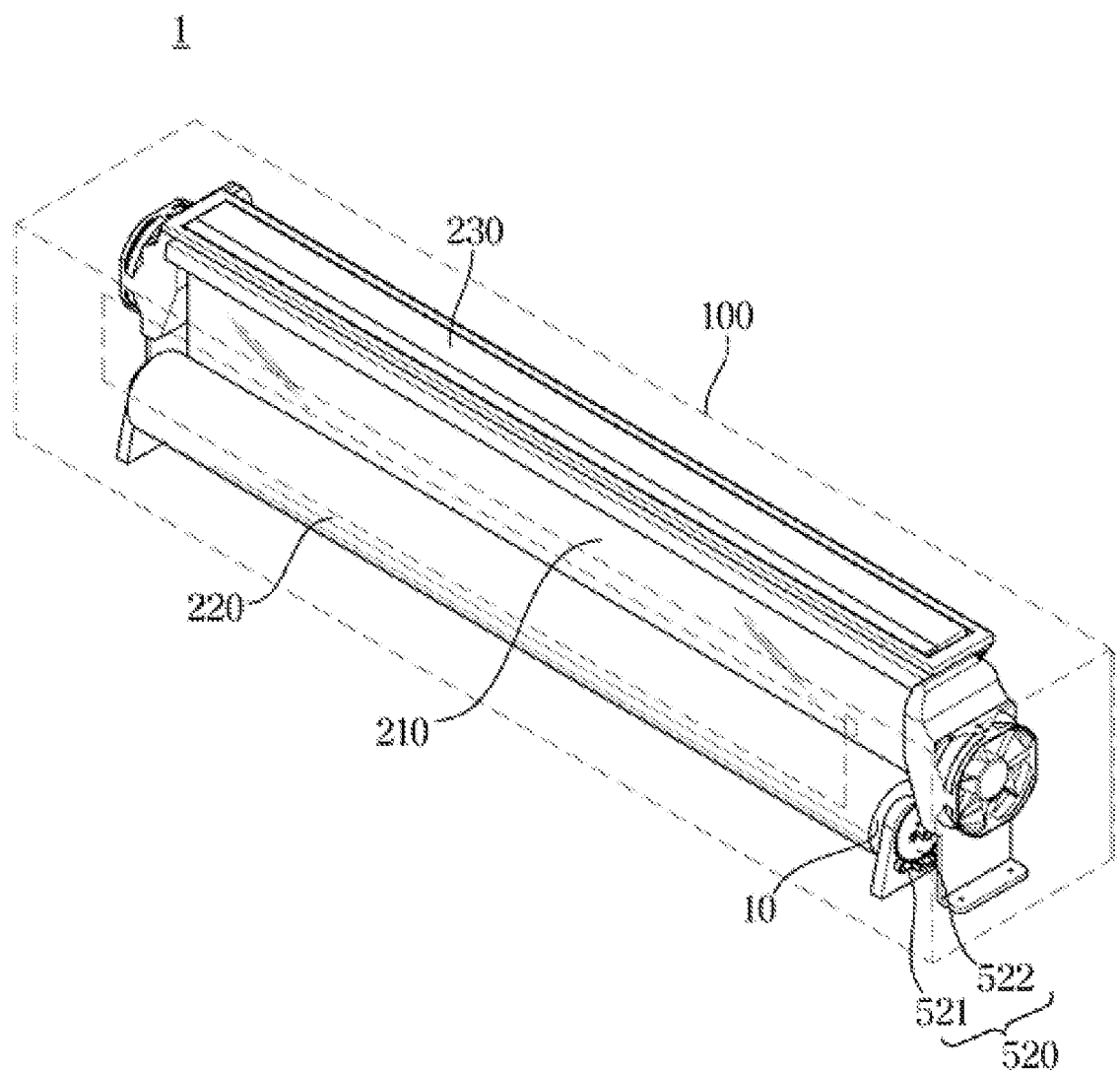
FIG. 9 is a front perspective view illustrating a state in which the display is inserted in the display apparatus according to one or more embodiments of the disclosure.

FIG. 9 is a front perspective view illustrating a state in which the display is inserted in the display apparatus according to one or more embodiments of the disclosure.

As shown in FIG. 9, in response to the display 200 being inserted into the housing 100, the display panel 210 and the display cover 220 may be integrally rolled around the roller 10.

The lifting device 300 may be driven by the controller 20 and the cap 230 of the display 200 linked to the lifting device 300 may be moved upward. The display panel 210 and the display cover 220 rolled around the roller 10 may be rotated and unrolled from the roller 10.

The upper end of the display 200 may be connected to the cap 230 and the lower end of the display 200 may be connected to the roller 10. Accordingly, the roller 10 may be configured to be rotated during the display 200 is unrolled.

The lifting device 300 may be configured to raise and lower the display 200 at a constant speed. Accordingly, the roller 10 may also be rotated at a constant speed.

In response to applying an external force to the display 200 being raised, the rising speed of the display 200 may be changed. For example, in response to an object being disposed on the cap 230, or in response to suddenly applying an external force in the lower side to the display 200, a relatively low rising speed of the display 200 may be measured.

In response to applying the external force to the lower side of the display 200, a driver of the roller 10 may be damaged, and in response to irregularly applying the external force to the left and right direction, the display panel 210 may be damaged, as described above.

Conversely, in response to applying the external force to the upper side of the display 200, a relatively high rising speed of the display 200 may be measured, and accordingly, the driver of the roller 10 and the display panel 210 may be damaged.

To alleviate such difficulty, the display apparatus 1 may include the rotation sensor 520 configured to sense a rotation value of the roller 10. The rotation sensor 520 may sense a rotational speed of the roller 10 by sensing a rotational angle, a rotational angular speed of the roller 10 or a torque value formed on the roller 10.

The rotation sensor 520 may sense the rotational speed of the roller 10 and transmit the sensed rotation speed to the controller 20.

In response to receiving a sensed value of a speed different from the input rotational speed of the roller 10, the controller 20 may control the lifting device 300 to stop a raising drive of the lifting device 300, and to lower the lifting device 300 to allow the first and second arm to be positioned at the first position 300A.

Therefore, in response to applying the external force to the display 200, the controller 20 may control the lifting device 300 to prevent the display 200 from being exposed to the outside of the housing 100 based on a sensed value of the rotation sensor 520 configured to detect a rotational speed of the roller 10.

The rotation sensor 520 may include a detector 521 configured to detect a rotation, and a detection target 522 configured to be rotated together with the roller 10.

The detection target 522 may be connected to a rotating shaft of the roller 10 and rotated together with the roller 10.

The rotation sensor 520 may sense the rotational speed of the roller 10 through various methods. For example, the rotation sensor 520 may be provided as a magnetic sensor.

A magnet may be disposed in the detection target 522 and the detector 521 may be formed of a magnet encoder configured to detect a magnet.

The detection target 522 may be formed in a circular plate, and a magnet may be disposed on a position spaced radially from a center of the detection target 522. Accordingly, in response to the rotation of the detection target 522, the magnet may also be rotated around a rotation axis of the detection target 522, and the detector 521 may detect a position of the magnet, thereby sensing the rotational speed of the roller 10.

Alternatively, the magnet may be directly coupled to the roller 10. The magnet may be disposed on a side surface of the roller 10. The detection target 522 may be omitted, and the detector 521 may be provided to face a lateral direction of the roller 10 and measure a position of the magnet rotated with the roller 10, thereby measuring the rotational speed of the roller 10.

However, the rotation sensor 520 is not limited thereto and may detect the rotational speed of the roller 10 in various ways.

Hereinafter a limit sensor 530 configured to detect a maximum lifting position of the lifting device 300 will be described in detail.

Figure 10:
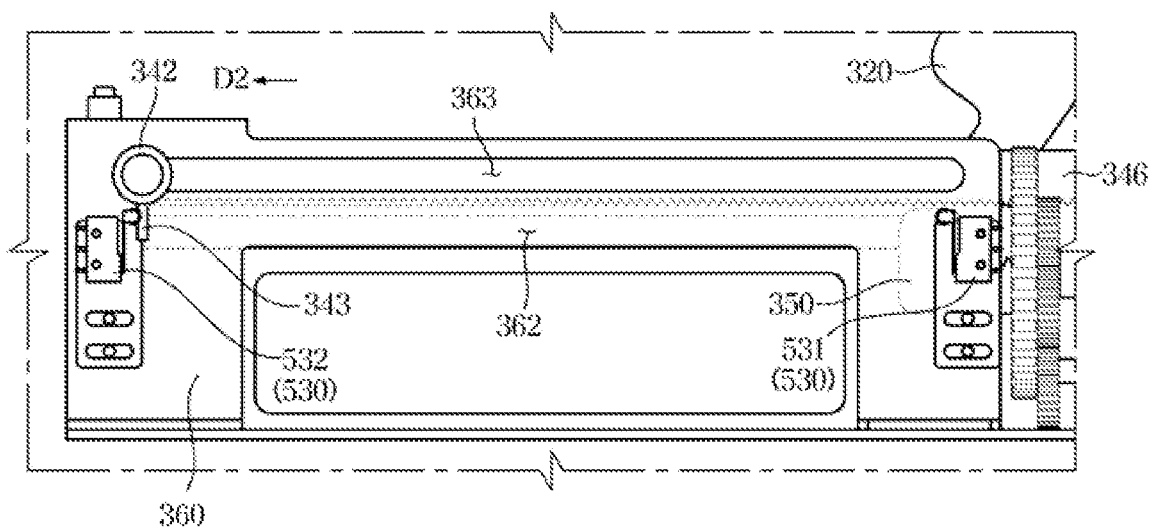
FIG. 10 is a view illustrating one or more configurations in a state in which the display protrudes in the display apparatus according to one or more embodiments of the disclosure.
Figure 11:
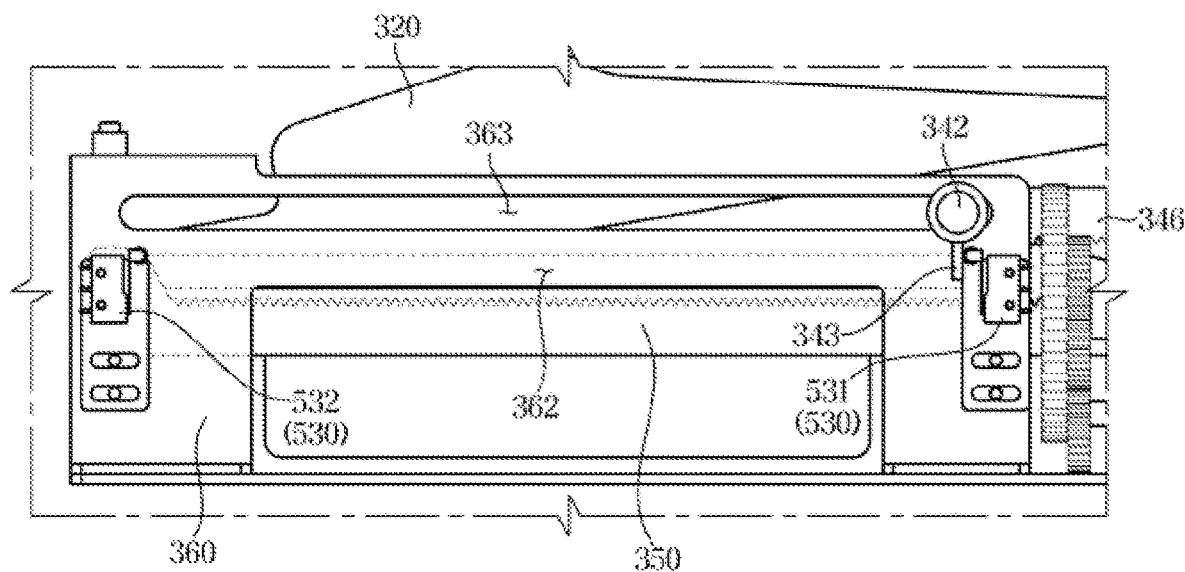
FIG. 11 is a view illustrating one or more configurations in a state in which the display is inserted in the display apparatus according to one or more embodiments of the disclosure.

FIG. 10 is a view illustrating one or more configurations in a state in which the display protrudes in the display apparatus according to one or more embodiments of the disclosure, and FIG. 11 is a view illustrating one or more configurations in a state in which the display is inserted in the display apparatus according to one or more embodiments of the disclosure.

As mentioned above, the first and second arms 310 and 320 may be moved between the first position 300A and the second position 300B. The first and second arms 310 and 320 may be moved in the up and down direction by the driver 330, thereby reaching the first position 300A and the second position 300B.

In response to the driver 330 being driven even when the first and second arms 310 and 320 reach the first position 300A or the second position 300B, stress may be generated in the display panel 210 and thus the display panel 210 may be damaged. Further, in response to an additional driving force being transmitted, the lifting device 300 may be damaged because the movement of the lifting device 300 is limited at the first position 300A and the second position 300B.

Accordingly, in response to the first and second arms 310 and 320 reaching the first position 300A or the second position 300B, the controller 20 may terminate the driving of the driver 330 by controlling the driver 330.

The display apparatus 1 may include the limit sensor 530 configured to sense a state in which the first and second arms 310 and 320 reach the first position 300A or the second position 300B and to transmit a sensed value to the controller 20.

The limit sensor 530 may include a first limit sensor 531 configured to detect that the first and second arms 310 and 320 reach the first position 300A and a second limit sensor 532 configured to detect that the first and second arms 310 and 320 reach the second position 300B.

By detecting the movement of the first drive transmission 340, the limit sensor 530 may sense that the first and second arms 310 and 320 are disposed at the first position 300A or the second position 300B. However, the disclosure is not limited thereto, and the limit sensor 530 may be provided to detect the movement of the second drive transmission 350.

As the first drive transmission 340 is translated in the first direction D1 or the second direction D2, the first drive transmission 340 may move the first arm 310 in the up and down direction. In response to the movement in the first direction D1, the first arm 310 may be moved downward, and in response to the movement in the second direction D2, the second arm 320 may be moved upward.

Accordingly, in response to the first drive transmission 340 being moved to a limit point in which the first drive transmission 340 is movable in the first direction D1, the first arm 310 may be disposed at the first position 300A, and in response to the first drive transmission 340 being moved to a movable limit point in the second direction D2, the first arm 310 may be disposed at the second position 300B.

The first limit sensor 531 may detect that the first drive transmission 340 is disposed at the limit point in which the first drive transmission 340 is movable in the first direction D1, and the second limit sensor 532 may detect that the first drive transmission 340 is disposed at the limit point in which the first drive transmission 340 is movable in the second direction D2.

The first and second limit sensors 531 and 532 may respectively detect that the first drive transmission 340 is disposed at the limit point in which the first drive transmission 340 is movable in the first direction D1 or the second direction D2, and transmit a sensed value to the controller 20.

In response to receiving the sensed value from the first and second limit sensors 531 and 532, the controller 20 may control the driver 330 to stop the driving of the driver 330 to prevent the first drive transmission 340, which is positioned at the limit point, in which the first drive transmission 340 is movable in the first direction D1 or the second direction D2, from receiving an additional driving force from the driver 330.

The limit sensors 531 and 532 may be provided as a contact-type sensor and thus the limit sensors 531 and 532 may sense a position, in which the first drive transmission 340 is disposed, in response to the contact of the first drive transmission 340. It may be appreciated that the limit sensors 531 and 532 may be provided as a limit switch type.

However, the disclosure is not limited thereto, and the limit sensors 531 and 532 may be provided as optical sensors or magnetic sensors to detect the position of the first drive transmission 340.

The bracket 360 may include a third slit 363 to which another part of the first drive transmission 340 is inserted.

As a part of the first drive transmission 340 is inserted to the first slit 361 as mentioned above, the translational movement of the first drive transmission 340 may be guided, and at the same time, the first drive transmission 340 may be fixed to the bracket 360.

Additionally, the first drive transmission 340 may be provided in such a way that other part 342 of the first drive transmission 340 is inserted into the third slit 363.

A contact portion 343 in physical contact with the limit sensors 531 and 532 may be provided on the other part 342 of the first drive transmission 340.

The contact portion 343 may be linked to the other part 342 of the first drive transmission 340 to be moved in the first direction D1 or the second direction D2.

As shown in FIG. 10, the second limit sensor 532 may be disposed to come into contact with the contact portion 343 in response to the first drive transmission 340 being disposed at the limit point movable in the second direction D2.

It may be appreciated that the second limit sensor 532 may be disposed adjacent to an end of the third slit 363 in the second direction D2. The third slit 363 may extend toward the first direction D1 and the second direction D2.

The end of the third slit 363 in the first direction D1 may be formed to correspond to a limit point at which the other part 342 of the first drive transmission 340 is movable in the first direction D1. The end of the third slit 363 in the second direction D2 may be formed to correspond to a limit point at which the other part 342 of the first drive transmission 340 is movable in the second direction D2.

Therefore, in response to the first drive transmission 340 being disposed at the limit point movable in the second direction D2, the other part 342 of the first drive transmission 340 may be disposed on the end of the third slit 363 in the second direction D2. Accordingly, the contact portion 343 may be easily in contact with the second limit sensor 532.

A state in which the contact portion 343 is in contact with the second limit sensor 532 is a state in which the first drive transmission 340 is disposed at the limit point movable in the second direction D2, and thus the first arm 310 is placed in the second position 300B.

The second limit sensor 532 may be in contact with the contact portion 343, thereby sensing the position of the first drive transmission 340. The second limit sensor 532 may transmit the sensed value to the controller 20, and in response to receiving the sensed value from the second limit sensor 532, the controller 20 may control the driver 330 to terminate the driving of the driver 330.

As shown in FIG. 11, the first limit sensor 531 may be disposed to come into contact with the contact portion 343 in response to the first drive transmission 340 being disposed at a limit point movable in the first direction D1.

It may be appreciated that the first limit sensor 531 is disposed adjacent to an end of the third slit 363 in the first direction D1.

Therefore, in response to the first drive transmission 340 being disposed at the limit point movable in the first direction D1, the other part 342 of the first drive transmission 340 may be disposed on the end of the third slit 363 in the first direction D1. Accordingly, the contact portion 343 may be easily in contact with first limit sensor 531.

A state in which the contact portion 343 is in contact with the first limit sensor 531 is a state in which the first drive transmission 340 is disposed at the limit point movable in the first direction D1, and thus the first arm 310 is placed in the first position 300A.

The first limit sensor 531 may be in contact with the contact portion 343, thereby sensing the position of the first drive transmission 340. The first limit sensor 531 may transmit the sensed value to the controller 20, and in response to receiving the sensed value from the first limit sensor 531, the controller 20 may control the driver 330 to terminate the driving of the driver 330.

Hereinbefore the arrangement and functions of the position sensor 510, the rotation sensor 520, and the limit sensor 530 have been described in detail. Hereinafter a method for determining an appearance error of the display and a control method based on each sensor will be described in detail with reference to FIGS. 12 to 14.

Figure 12:
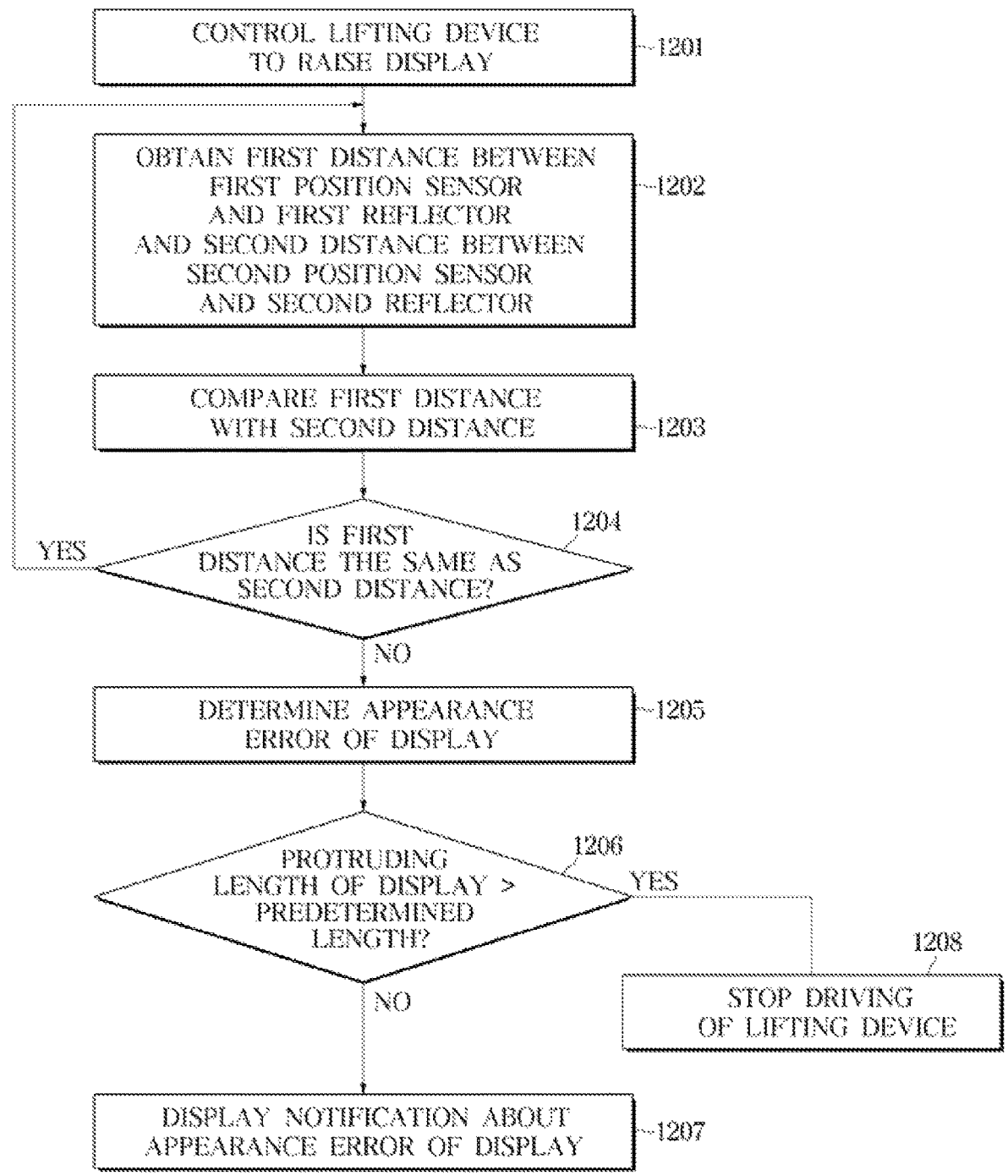
FIG. 12 is a flow chart of a control method of the display apparatus according to one or more embodiments.
Figure 13:
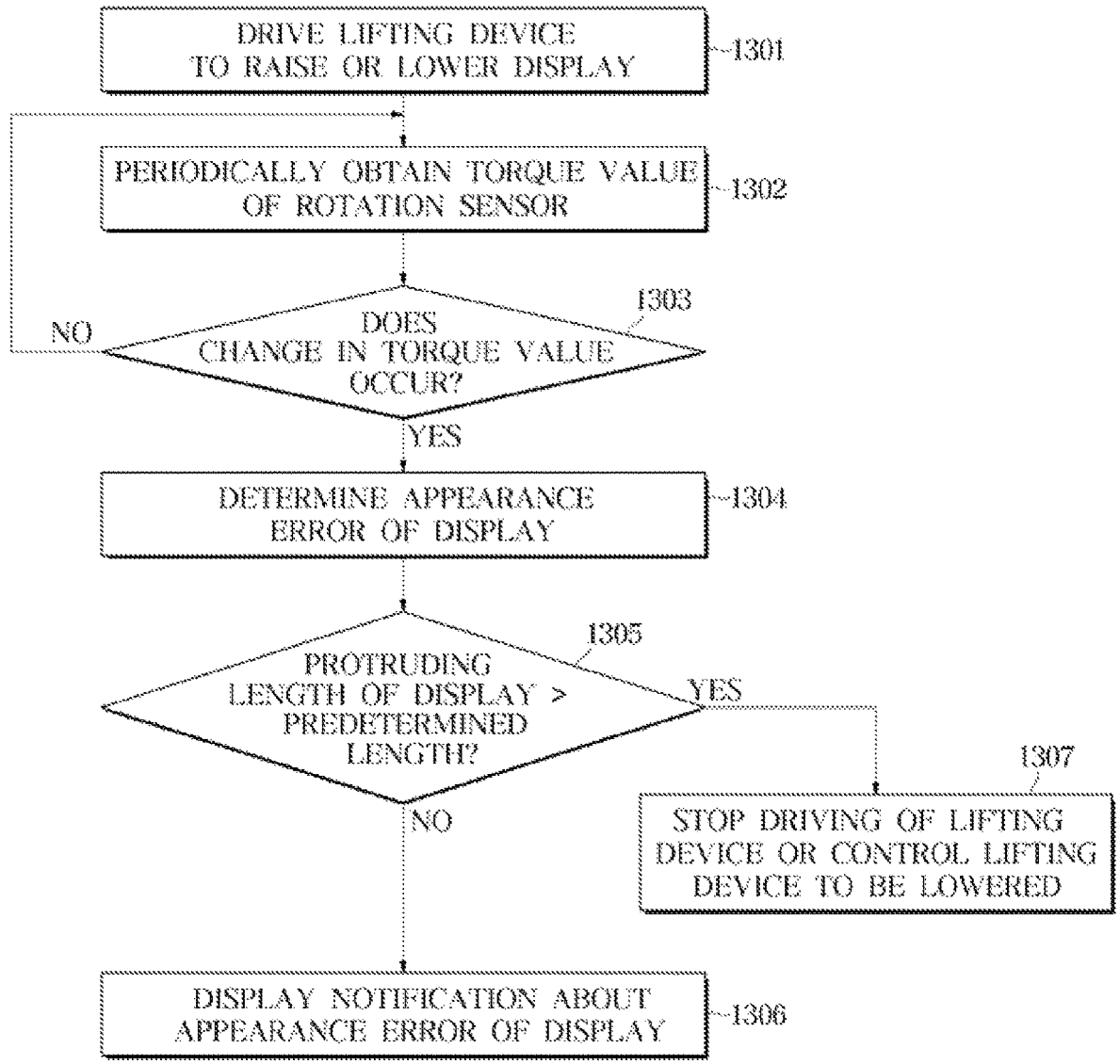
FIG. 13 is a flow chart of a control method of the display apparatus according to one or more embodiments.
Figure 14:
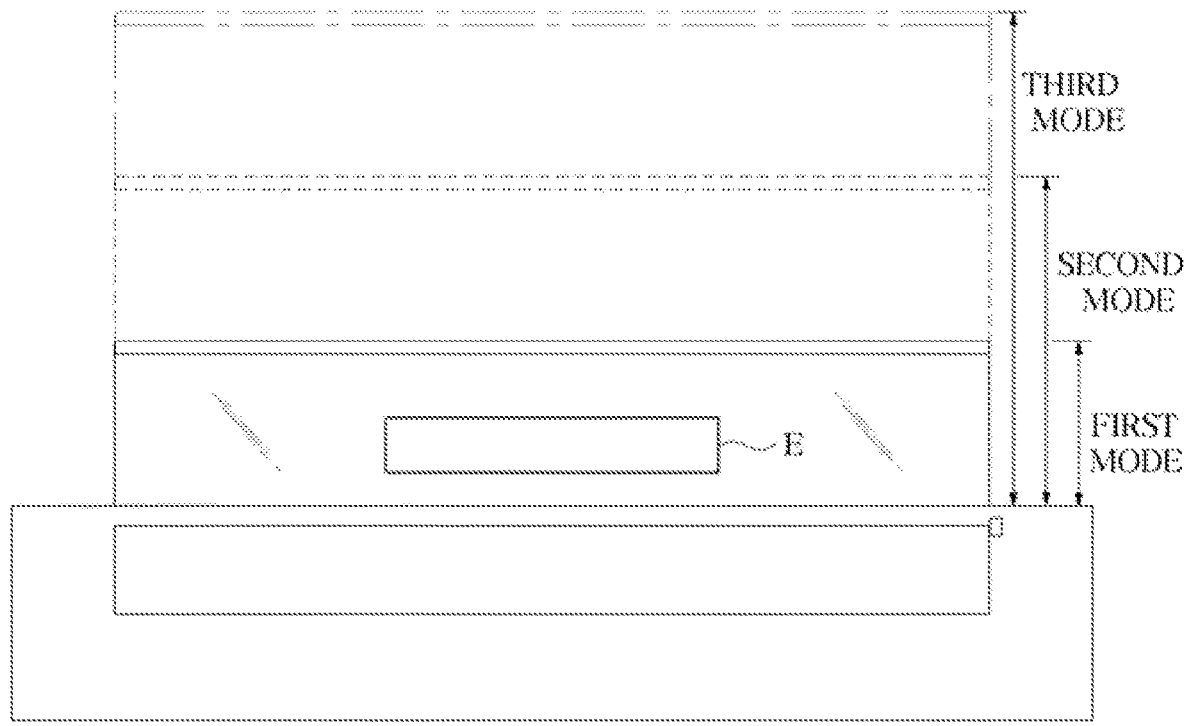
FIG. 14 is a view illustrating a first mode to a third mode of the display apparatus according to one or more embodiments.

FIGS. 12 and 13 are flow charts of a control method of the display apparatus according to one or more embodiments, and FIG. 14 is a view illustrating a first mode to a third mode of the display apparatus according to one or more embodiments. However, the control method according to FIGS. 12 and 13 is a non-limiting example for achieving the object of the disclosure, and it should be understood that some steps are added or deleted as necessary.

First, the control method based on the position sensor 510 will be described with reference to FIG. 12.

The controller 20 controls the lifting device 300 to raise the display 200 (1201). A height of the first end 231 and a height of the second end 232 of the display 200 may be different in response to applying the external force to the display 200 during the display 200 is raised. For example, in response to an object being disposed on the cap 230, or in response to suddenly applying the external force to the lower side to the display 200, a height difference between the first end 231 and the second end 232 may occur.

To determine the height difference, the controller 200 obtains a first distance between the first position sensor 511 and the first reflector 233 and a second distance between the second position sensor 512 and the second reflector 234 (1202). During the lifting device 300 is operated, the first and second position sensors 511 and 512 may continuously transmit the distance L from the first position sensor 511 to the first reflector 233 and the distance L from the second position sensor 512 to the second reflector 234 to the controller 20.

The controller 20 compares the first distance with the second distance (1203), and in response to the first distance and the second distance being the same (1204), the controller 20 determines that an error does not occur in the raising or lowering of the display 200.

In contrast, in response to determination that a difference occurs between the first distance and the second distance based on the result of the comparison between the first distance and the second distance (1204), the controller 20 determines that an appearance error of the display occurs (1205). For example, in response to the first distance having a value greater than the second distance (1206), the controller 20 may determine that an external force is applied to the second end of the display 200 or an object is placed at the second end of the display 200.

A difference in height between the first end 231 and the second end 232 of the display 200 may occur at various height positions during the appearance of the display 200. Accordingly, the controller 20 may perform various controls based on a degree of appearance of the display 200. According to the disclosure, the degree of appearance of the display 200 may be classified into three types. Referring to FIG. 14, the degree of appearance of the display 200 may include a first mode configured to perform basic notification display and audio functions, a second mode configured to display a screen with a 16:9 aspect ratio, and a third mode configure to display a screen with a 4:2 aspect ratio.

In response to an appearance distance of the display 200 being greater than a predetermined distance, the controller 20 may immediately stop the driving of the lifting device 300 (1208). For example, in response to the degree of the appearance of the display 200 being equal to or greater than the second mode, the controller 20 may immediately stop the driving of the lifting device 300 to notify a user of the appearance error of the display 200. The appearance distance of the display 200 may be determined by one of the first distance or the second distance or by detecting a state in which the first and second arms 310 and 320 reach a third position by the limit sensor 530. The third position is a position between the first position 300A and the second position 300B, and indicates a position corresponding to a position where the first and second arms 310 and 320 reach the first mode.

In response to the appearance distance of the display 200 being equal to or less than the predetermined distance, the controller 20 may notify a user of the appearance error of the display 200 by displaying a notification about the appearance error of the display 200 on the display 200 (1207). For example, in response to the degree of the appearance of the display 200 corresponding to the first mode, the controller 20 may display information on the appearance error E, thereby notifying a user of the appearance error, as illustrated in FIG. 14.

Next, a control method based on the rotation sensor 520 will be described with reference to FIG. 13.

The controller 20 controls the lifting device 300 to raise or lower the display 200 (1301). According to one or more embodiments, it is to prevent an overload due to a load of an object in a state in which the object is placed on the cap 230.

Accordingly, the controller 20 periodically obtains a torque value of the rotation sensor 520 during the display 200 is raised or lowered (1302), and the controller determines whether a change in the torque value occurs (1303). The controller 20 may obtain a torque value of the rotation sensor 520 every predetermined time, sequentially compare an amount of change in the torque value before and after, or detect a case in which an amount of change in the torque value is different from a predetermined value.

In response to the change in the torque value not occurring (1303), the controller 20 determines that an error does not occur in the raising or lowering of the display 200 and controls the raising or lowering of the display 200 to continue.

On the contrary, in response to detecting the change in the torque value based on a result of measuring the torque value (1303), the controller 20 may determines that the appearance error of the display 200 occurs (1304).

The change in the torque value may occur at various height positions during the appearance of the display 200. Accordingly, the controller 20 may perform various controls based on the degree of appearance of the display 200.

In response to the appearance distance of the display 200 being greater than the predetermined distance, the controller 20 may immediately stop the driving of the lifting device 300 or control the lifting device 300 to be lowered (1307). For example, in response to the degree of the appearance of the display 200 being equal to or greater than the second mode, the controller 20 may immediately stop the driving of the lifting device 300 to notify a user of the appearance error of the display 200. Further, in response to the degree of the appearance of the display 200 being greater than the second mode, and in response to the display 200 in a state of being raised, the controller 20 may control the lifting device 300 to be lowered to prevent the display 200 from being driven in the opposite to the load (1307). The appearance distance of the display 200 may be determined by one of the first distance or the second distance or by detecting a state in which the first and second arms 310 and 320 reach a third position by the limit sensor 530. The third position is a position between the first position 300A and the second position 300B, and indicates a position corresponding to a position where the first and second arms 310 and 320 reach the second mode or the third mode.

In response to the appearance distance of the display 200 being equal to or less than the predetermined distance, the controller 20 may notify a user of the appearance error of the display 200 by displaying a notification about the appearance error of the display 200 on the display 200 (1306). For example, in response to the degree of the appearance of the display 200 corresponding to the first mode, the controller 20 may display information on the appearance error E, thereby notifying a user of the appearance error, as illustrated in FIG. 14.

Hereinafter another method configured to drive the lifting device 300 will be described in detail.

Figure 15:
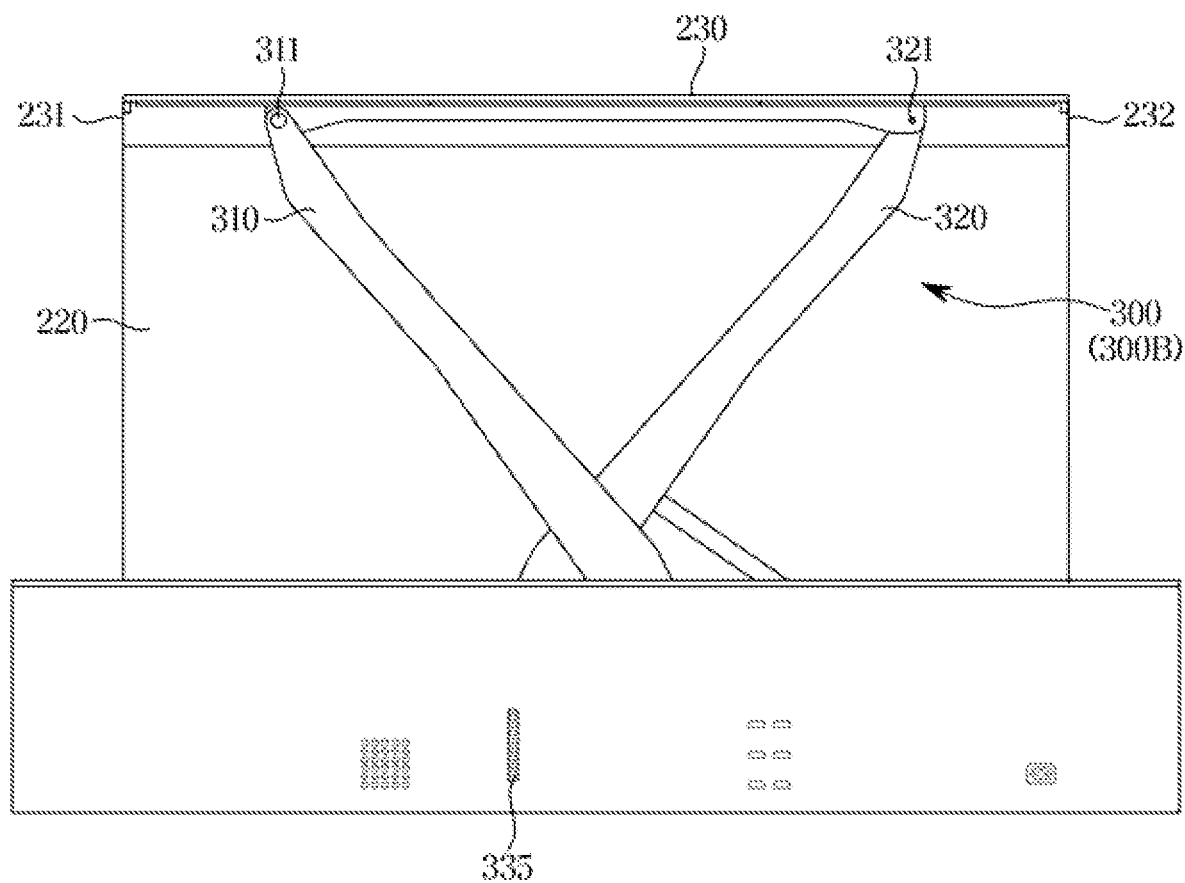
FIG. 15 is a rear view of the display apparatus according to one or more embodiments of the disclosure.

FIG. 15 is a rear view of the display apparatus according to one or more embodiments of the disclosure.

As mentioned above, the lifting device 300 may raise and lower the display 200 by being controlled by the controller 20.

The driver 330 of the lifting device 300 may be driven by being electrically connected to the controller 20 and a power supply device.

The power supply device may receive power from the outside and supply power to the display apparatus 1. In response to cutting off the external power while driving the driver 330, power may be not supplied to the driver 330 and thus the driving of the driver 330 may be stopped.

In response to stopping the driving of the driver 330 during the lifting device 300 is raised or lowered, the display 200 may also be exposed to the outside of the housing 100 because the external power is cut off and the display 200 is not driven.

Accordingly, the display 200 may be unnecessarily exposed to the outside of the housing 100 for a long time, thereby causing a risk of damage.

To reduce such a risk, the display apparatus 1 may include a battery 40 configured to supply power to the lifting device 300 and the controller 20 separately from the external power (refer to FIG. 2).

The battery 40 may be configured to supply power to the driver 330 to allow the first and second arms 310 and 320 to be moved from the second position 200B to the first position 300A in response to the external power being not supplied.

Accordingly, even when the external power is cut off, the driver 330 and the controller 20 may be supplied with power from the battery 40 and drive the driver 330 to move the first and second arms 310 and 320 to the first position 300A.

Therefore, the display 200 may be provided to be inserted into the housing 100 even in situations such as power failure, and thus it is possible to reduce the risk of being exposed to the outside for a long time.

Further, the display apparatus 1 may include a manual wheel 335 configured to manually drive the lifting device 300 without receiving a driving force from the driver 330.

As shown in FIG. 15, the manual wheel 335 may be provided such that at least a part of the manual wheel 335 passes through the rear surface 103 of the housing 100 and is exposed to the outside.

The manual wheel 335 may be configured to be connected to the transmission member 333.

Therefore, in response to the manual wheel 335 being rotated in one direction or an opposite direction by a user, the transmission member 333 may be rotated in the one direction R1 or in the opposite direction R2 by the rotation of the manual wheel 335 to move the first and second arms 310 and 320.

Referring to FIG. 5, the manual wheel 335 may include a wheel gear 337 configured to be rotated about a rotation axis of the manual wheel 335 and connected to the manual wheel 335.

The driver 330 may include an auxiliary gear 336 configured to connect the wheel gear 337 to the motor-side gear 332. The auxiliary gear 336 may be engaged with the wheel gear 337.

The auxiliary gear 336 may be configured to be rotated around a rotation axis of the motor-side gear 332. The auxiliary gear 336 may be provided as a part of the motor-side gear 332 and disposed at one end of the motor-side gear 332 formed as a worm gear.

In response to the manual wheel 335 being rotated in one direction by a user, the wheel gear 337 may be rotated in one direction together with the manual wheel 335, and the auxiliary gear 336 engaged with the wheel gear 337 may be rotated, thereby rotating the motor-side gear 332.

Accordingly, the motor-side gear 332 may be rotated without the rotational force of the motor 331, and accordingly, the transmission member 333 may be rotated to drive the first and second arms 310 and 320.

Hereinafter the cleaning assembly 400 configured to remove foreign substances introduced from the outside of the display apparatus 1 will be described in detail.

Figure 16:
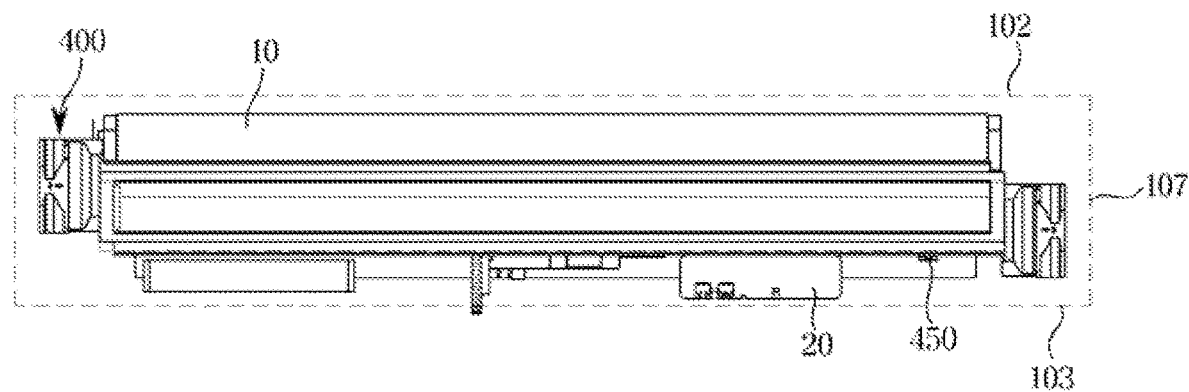
FIG. 16 is a plan view of the display apparatus according to one or more embodiments of the disclosure.
Figure 17:
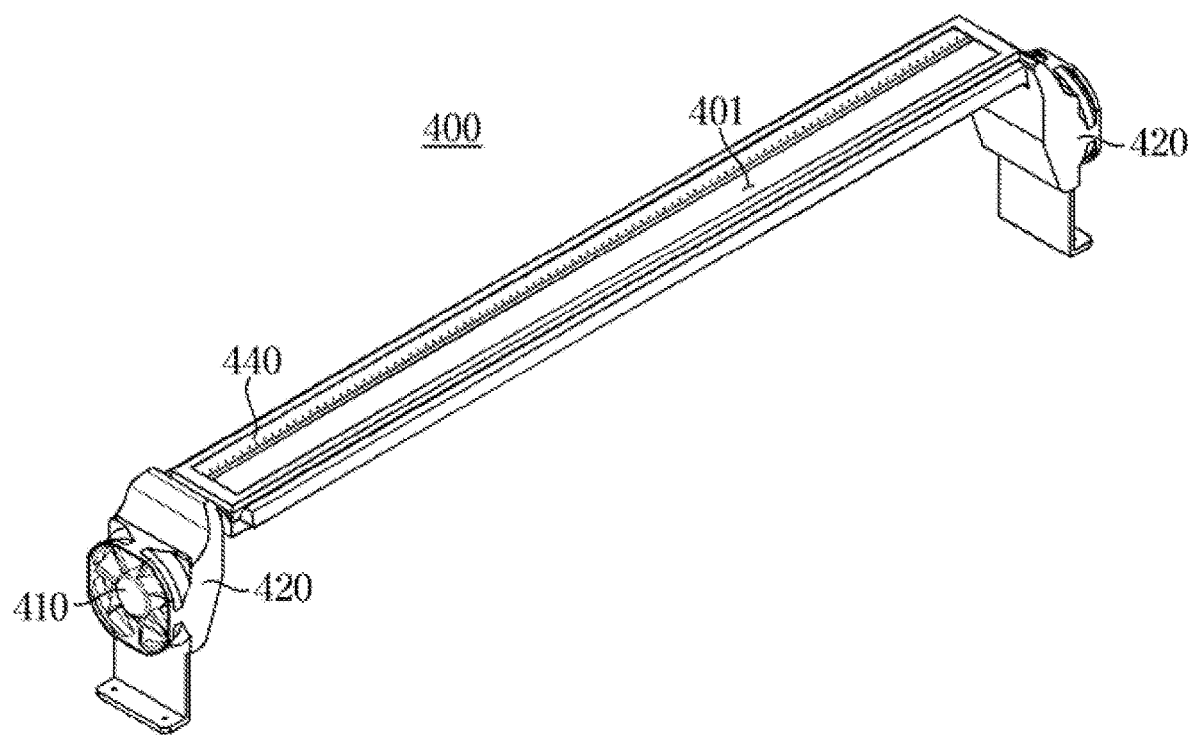
FIG. 17 is a view illustrating one or more configurations of the display apparatus according to one or more embodiments of the disclosure.
Figure 18:
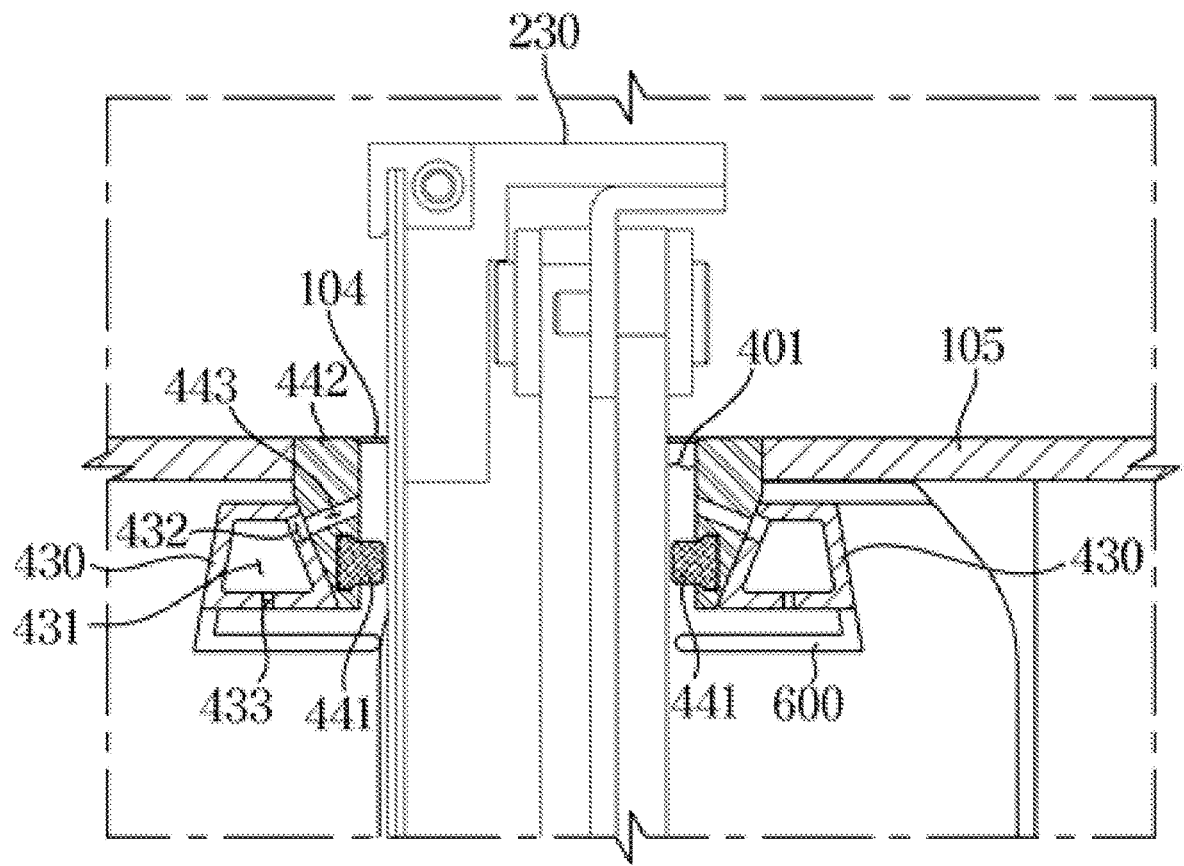
FIG. 18 is a side sectional view illustrating one or more configurations of the display apparatus according to one or more embodiments of the disclosure.

FIG. 16 is a plan view of the display apparatus according to one or more embodiments of the disclosure, FIG. 17 is a view illustrating one or more configurations of the display apparatus according to one or more embodiments of the disclosure, and FIG. 18 is a side sectional view illustrating one or more configurations of the display apparatus according to one or more embodiments of the disclosure.

As shown in FIGS. 16 to 18, the display apparatus 1 may include the cleaning assembly 400 configured to discharge foreign substance, which flow through the opening 104 of the housing 100, to the outside of the housing 100.

In response appearance of the display 200 from the housing 100, external foreign substances may be introduced into the housing 100 through the opening 104, and in response to the insertion of the display 200, foreign substances placed on the display 200 may be introduced into the housing 100 together with the display 200.

The cleaning assembly 400 may be disposed inside the housing 100. The cleaning assembly 400 may include an opening 401 through which the display 200 passes in response to the display 200 being moved in the up and down direction.

In addition, the lifting device 300 moved in the up and down direction together with the display 200 may also be moved through the opening 401.

The cleaning assembly 400 may discharge foreign substances, which are seated in the display 200 and the lifting device 300 moved through the opening 401, to the outside of the housing 100 through the opening 104 of the housing 100.

The cleaning assembly 400 may include a fan 410, a fan housing 420, and a duct 430 through which air blown from the fan 410 flows.

The fan 410 may be provided as a pair. The pair of fans 410 may be disposed on side surfaces of the display 200 and the lifting device 300, respectively. The pair of fans 410 may be disposed inside the housing 100 to be adjacent to the pair of side surfaces 107 of the housing 100, respectively. However, the disclosure is not limited thereto and the fan 410 may be provided as a single piece.

The pair of fans 410 may be configured to blow air toward the opening 104 of the housing 100. Accordingly, the pair of fans 410 may discharge foreign substances introduced through the display 200 or foreign substances directly introduced through the opening 104 of the housing 100, to the outside of the opening 104 of the housing 100.

The fan housing 420 may be provided as a pair to correspond to the pair of fans 410. The duct 430 may be configured to allow the air blown from the pair of fans 410 to flow into the opening 104 side of the housing 100.

The duct 430 may be configured to communicate with the pair of fan housings 420. The duct 430 may be configured to be connected to the pair of fans, respectively.

The duct 430 may extend along a direction in which the pair of fans 420 is spaced apart. The duct 430 may be provided as a pair that is vertically spaced in an extending direction of the ducts 430.

The pair of ducts 430 may be provided to extend in the direction in which the pair of side surfaces 107 of the housing 100 are arranged with respect to the housing 100, and the pair of ducts 430 may be spaced apart from each other in a direction in which the front surface 102 and the rear surface 103 are arranged.

The opening 401 of the cleaning assembly 400 may be formed in a space between the pair of ducts 430. Accordingly, the display 200 and the lifting device 300 may be raised and lowered between the pair of ducts 430.

The cleaning assembly 400 may include a brush unit 440 disposed on an inner surface of the pair of ducts 430, that is, a surface of the pair of ducts 430 facing each other.

The brush unit 440 may include a brush 441 configured to remove foreign substances seated on the display 200 and the lifting device 300 through contact in response to the display 200 and the lifting device 300 being raised or lowered.

Therefore, even when the fan 410 is not operated, the display 200 and the lifting device 300 may come into contact with the brush 441 as the display 200 and the lifting device 300 are raised and lowered, and thus, foreign substances seated on the display 200 and the lifting device 300 may be removed.

The brush unit 440 may be provided in a pair to correspond to the pair of ducts 430. A pair of brush units 440 may be disposed on a surface where each pair of ducts 430 faces each other.

Therefore, the pair of brush units 440 may be disposed closer to the display 200 and the lifting device 300 than the pair of ducts 430.

The pair of brush units 440 may be disposed adjacent to the front surface 102 and the rear surface 103 of the housing 100, respectively. The brush unit 440 disposed adjacent to the front surface 102 of the housing 102 may be provided to come into contact with the display panel 210 to remove foreign substances seated on the display panel 210.

The brush unit 440 disposed adjacent to the rear surface 103 of the housing 100 may be provided to come into contact with the display cover 220 and the lifting device 300, to remove foreign substances seated on the display cover 220 and the lifting device 300.

The brush 441 disposed on the pair of brush units 440 may be provided to maintain contact with the display 200 and the lifting device 300. Therefore, in response to the movement of the display 200 and the lifting device 300, the brush 441 may come in contact with the display 200 and the lifting device 300, and accordingly, foreign substances may be removed by the brush 441.

The brush unit 440 may include a body 442 on which the brush 441 is disposed.

The body 442 may be disposed on the inner surface of the pair of ducts 430. In addition, the body 442 may be provided to extend along an inside of a rim of the opening 104 of the housing 100 extending in the left and right direction.

An upper surface of the body 442 may be provided to be disposed at the same height as the upper surface 105 of the housing 100. However, the disclosure is not limited thereto, and the upper surface of the body 442 may be disposed lower than the upper surface 105 of the housing 100.

The body 442 may be configured to be detachable from the duct 430. Accordingly, a user may remove foreign substances remaining in the brush 441 by separating the body 442 from the duct 430.

The body 442 may be configured to be completely separated from the duct 430. In addition, it may be appreciated that the body 442 may not need to be configured to be completely separated from the duct 430 and may be rotatably separated through a configuration such as a hinge. One side of the body 442 and one side of the duct 430 are hinged and thus a user presses the other side of the body 442 to allow the body 442 to be rotated and to protrude to the outside of the housing 100.

Accordingly, a user can remove foreign substances remaining in the brush disposed on the body 442 protruding to the outside of the housing 100, and then the user can rotate the body 442 again and seat the body 442 on the duct 430.

The duct 430 may include a flow path 431 extending in the left and right directions of the housing 100 to allow air to flow and a connection hole 432 configured to allow the flow path 431 to communicate with the brush unit 440.

The connection hole 432 may be provided in plural. The plurality of connection holes 432 may be spaced apart from each other in a direction in which the flow path 431 extends.

The brush unit 440 may include a discharge hole 443 provided to communicate with the connection hole 432 and provided to discharge air introduced from the duct 430 to the outside.

The discharge hole 443 may be provided in plural to correspond to the plurality of connection holes 432.

The discharge hole 443 may discharge air to the display 200 and the lifting device 300 to discharge foreign substances seated on the display 200 and the lifting device 300 to the outside of the opening 104 of the housing 100.

The discharge hole 443 may be provided to pass through the body 442. The discharge hole 443 may be provided to penetrate from one side of the body 442 coupled to the duct 430 to the other side of the body 442 facing the display 200 or the lifting device 300.

Between the pair of brush units 440, the brush unit 440 disposed adjacent to the front surface 102 of the housing 100 may be configured to discharge air, which is introduced from the duct 430, to the display panel 210.

In addition, between the pair of brush units 440, the brush unit 440 disposed adjacent to the rear surface 103 of the housing 100 may be configured to discharge air, which is introduced from the duct 430, to the display cover 220 and the lifting device 300.

The brush unit 440 may remove foreign substances seated on the display 200 and the lifting device 300 through the contact with the brush 44.

The foreign substances collected by the brush 441 may be discharged to the outside of the housing 100 through the air discharged from the discharge port 442 of the brush unit 440. In addition, through blowing of air, the brush unit 440 may be provided to directly remove foreign substances seated on the display 200 and the lifting device 300.

The display apparatus 1 may include a dust collection sensor 450 configured to determine whether foreign substances are collected inside the pair of brush units 440 or in the opening 401 of the cleaning assembly 400.

The dust collection sensor 450 may be electrically connected to the controller 20. The dust collection sensor 450 may sense whether foreign substances are collected in the opening 401 of the cleaning assembly 400.

When the dust collection sensor 450 senses a state in which foreign substances are collected and then transmit a sensed value to the controller 20, the controller 20 may control the fan 410 to drive the cleaning assembly 400.

According to one or more embodiments, the controller 20 may control the fan 410 to drive the cleaning assembly 400 based on the fact that the dust collection sensor 450 detects the foreign substances. In response to detecting the foreign substances, the controller 20 may allow at least one of a first fan 411 or a second fan 412 to be driven, thereby removing the foreign substances from the display 200.

In response to the fan 410 being driven each time the display apparatus 1 is operated, the life of various parts for removing foreign substances may be affected. To alleviate this difficulty, the controller 20 according to one or more embodiments may control the fan 410 to be driven according to a cycle of operating times of the lifting device 300. For example, the controller 20 may allow the fan 410 to be driven only in an odd-numbered operation or only in an even-numbered operation among a first operation, a second operation and a third operation of the display apparatus 1.

In addition, according to one or more embodiments, the controller 20 may allow the fan 410 to be driven only at an off-state of the display 200. At an on-state of the display 200, it is relatively difficult to separate foreign substances from the surface due to static electricity. Therefore, according to one or more embodiments, the fan 410 may be driven only at the off-state of the display 200 in which static electricity is relatively small, and thus the foreign substance may be effectively removed.

In a state in which the foreign substances are collected in the opening 401 of the cleaning assembly 400, the controller 20 may control the cleaning assembly 400 to discharge the foreign substances to the outside of the housing 100 through the opening 104 of the housing 100 by driving the fan 410 in response to the display 200 being raised or lowered.

The display apparatus 1 may include a drain tray 600 configured to collect liquid to prevent the liquid from reaching various electric components arranged inside the housing 100 in response to that liquid, such as water is introduced into the inside of the housing 100 through the opening 104 of the housing 100.

In response to the insertion of the display 200 or the lifting device 300, on which liquid is sprinkled, into the housing 100, the liquid remaining on the display 200 or the lifting device 300 may flow into the housing 100.

In addition, in response to the display 200 and the lifting device 300 being raised or lowered, the liquid may be directly introduced into the housing 100 through the opening 104 of the housing 100.

The drain tray 600 may be disposed adjacent to the opening 104 of the housing 100. Accordingly, in response to the liquid being introduced into the housing 100 through the opening 104 of the housing 100, the liquid may be collected in the drain tray 600.

The drain tray 600 may be disposed under the duct 430. The drain tray 600 may be disposed on a path, through which liquid is directly introduced through the opening 104 of the housing 100, and thus the drain tray 600 may collect the liquid.

The display 200 and the lifting device 300 may be provided to be raised and lowered between the pair of ducts 430 or the pair of brush units 400. The drain tray 600 may disposed under the pair of ducts 430 to collect the liquid remaining on the display 200 or the lifting device 300.

The duct 430 may include an auxiliary discharge port 433 provided to communicate with the flow path 341 and configured to discharge air toward the drain tray 600.

As mentioned above, the duct 430 may be a space in which the air blown by the driving of the fan 410 flows, and an amount of air flowing on the flow path 341 may be moved to the drain tray 600 to efficiently evaporate the liquid collected in the drain tray 600.

The auxiliary discharge port 433 may be opened toward the direction in which the drain tray 600 is disposed on the body 422. Accordingly, some amount of air, which flows in response to driving of the fan 410, may be moved to the 600.

Hereinafter a display apparatus 1 according to one or more embodiments of the disclosure will be described. Components other than an upper sensor 540 to be described below are the same as those of the display apparatus 1 according to one or more embodiments described above.

Figure 19:
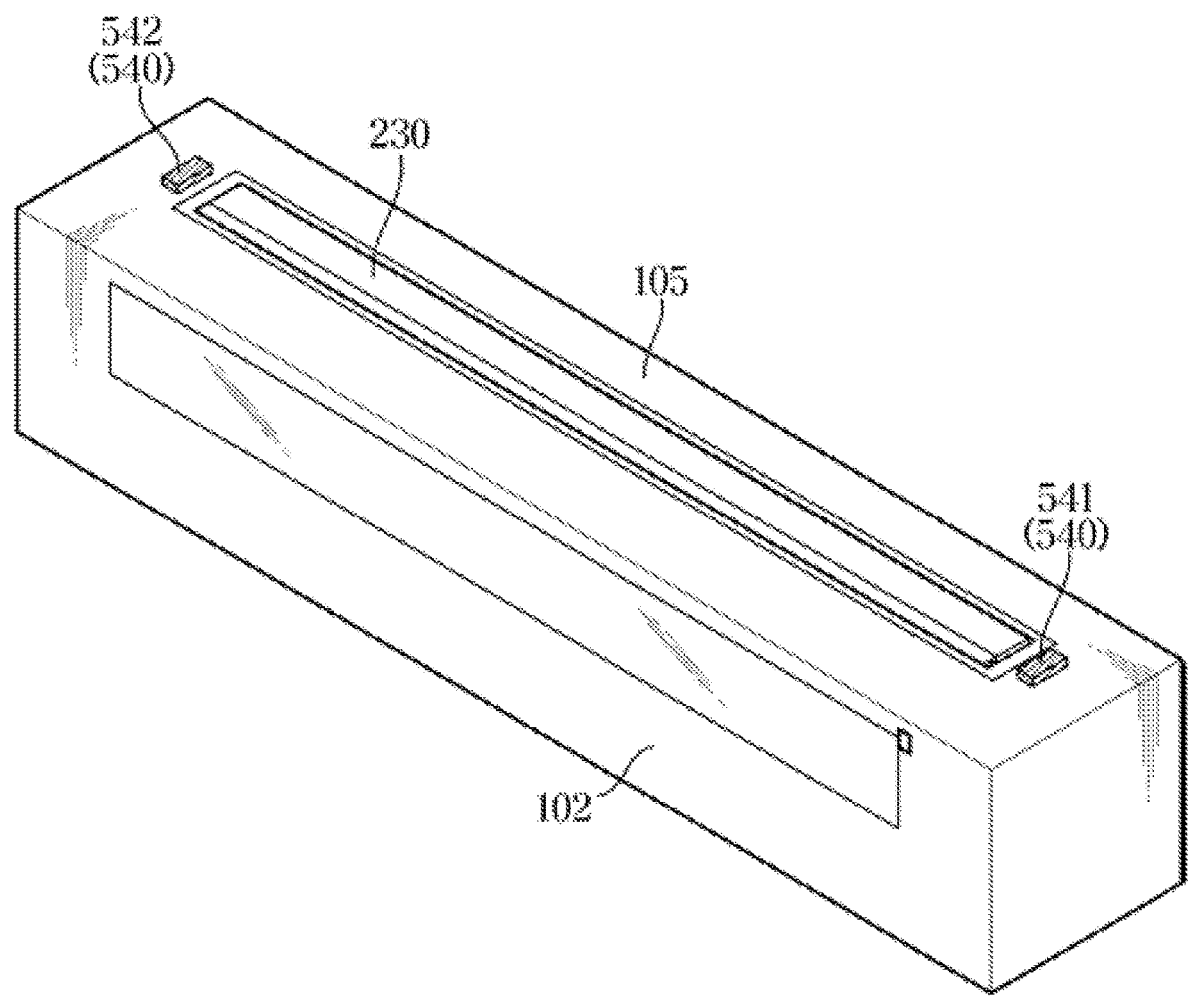
FIG. 19 is a perspective view of a display apparatus according to one or more embodiments of the disclosure.

FIG. 19 is a perspective view of a display apparatus according to one or more embodiments of the disclosure.

The display apparatus 1 may include the upper sensor 540 configured to detect whether an object is loaded on the upper surface 105 of the housing 100.

The upper sensor 540 may sense whether an object is loaded on the upper surface 105 of the housing 100, such as the upper surface of the cap 230.

The upper sensor 540 may be electrically connected to the controller 20. The upper sensor 540 may transmit a sensed value, which is on whether an object is loaded, to the controller 20.

In response to detecting that the object is loaded on the cap 230, the controller 20 may control the lifting device 300 not to drive even when a driving signal of the display 200 is input from a user.

The upper sensor 540 may be disposed on opposite sides of the cap 230 in the left and right direction of the housing 100.

The upper sensor 540 may be provided as an optical sensor. The upper sensor 540 may include a sensing portion 451 configured to emit light and configured to receive the emitted light, and a reflector 452 configured to reflect light emitted from the sensing portion 451.

The sensing portion 451 may be disposed on one side of the cap 230 and the reflector 452 may be disposed on the other side of the cap 230.

The upper sensor 540 may detect whether an object is placed between the sensing portion 451 and the reflector 452 by emitting light and collecting the reflected light.

However, the disclosure is not limited thereto, and the upper sensor 540 may be provided as another type of sensor.

The upper sensor 540 may be disposed on the upper surface 105 of the housing 100. However, the disclosure is not limited thereto, and the upper sensor 540 may be disposed on the upper surface of the cap 230.

Hereinafter a display apparatus 1 according to one or more embodiments of the disclosure will be described. Configurations other than a lifting device 700 described below are the same as those of the display apparatus 1 according to one or more embodiments of the disclosure.

Figure 20:
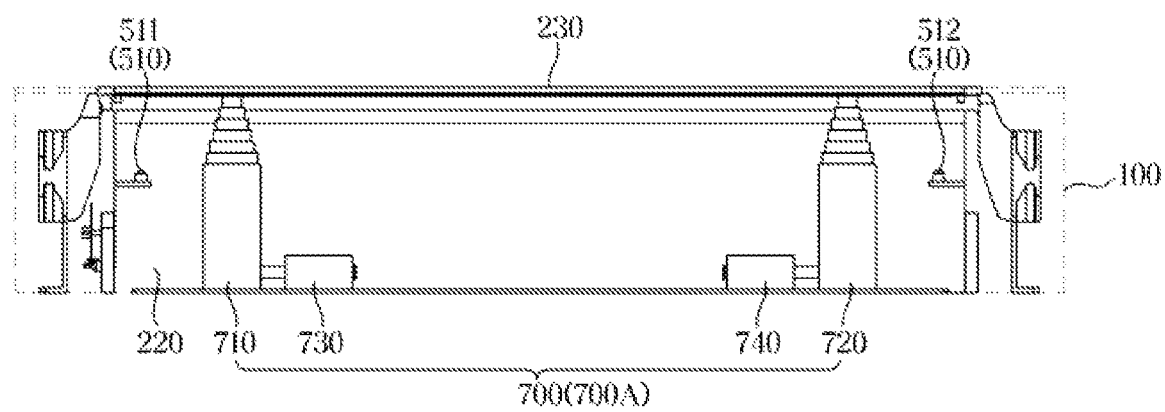
FIG. 20 is a rear view illustrating a state in which a display is inserted into a housing in a display apparatus according to one or more embodiments of the disclosure.
Figure 21:
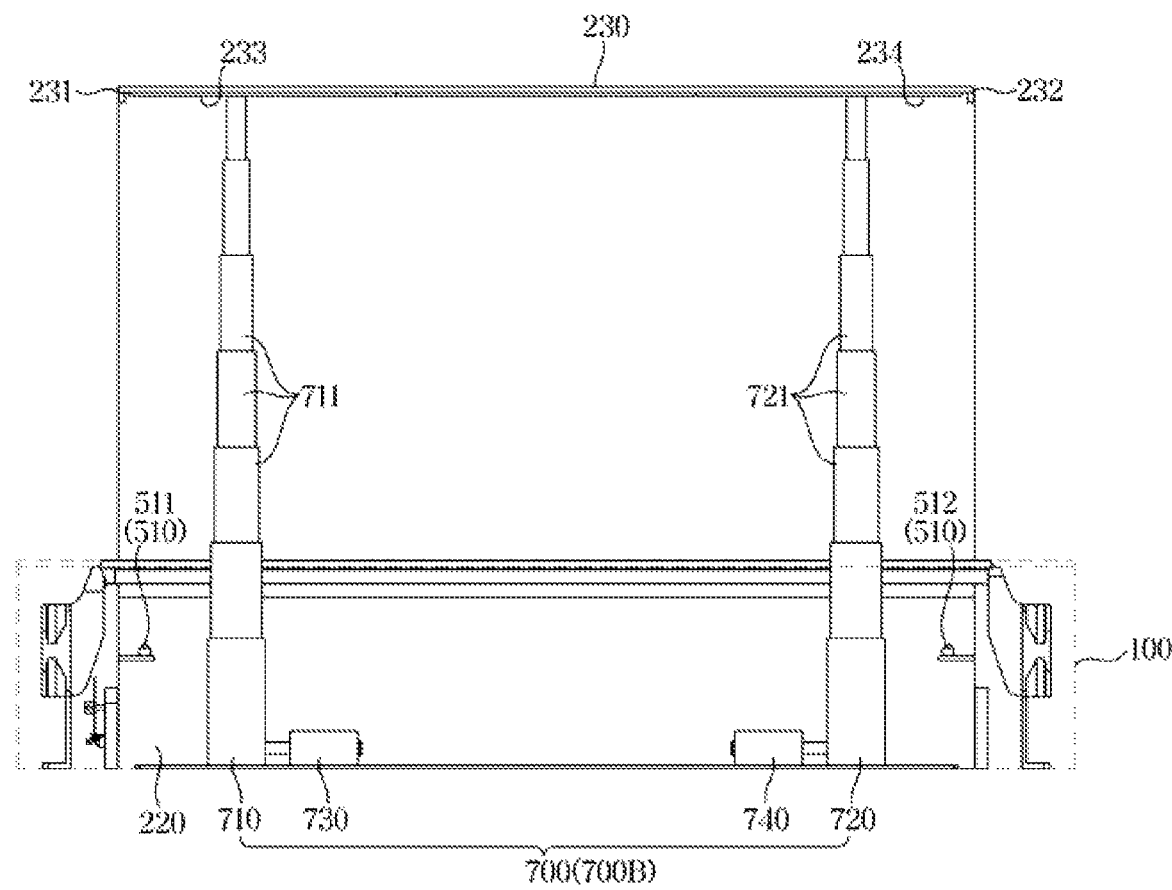
FIG. 21 is a rear view illustrating a state in which the display is inserted into the housing in the display apparatus of FIG. 18.

FIG. 20 is a rear view illustrating a state in which a display is inserted into a housing in a display apparatus according to one or more embodiments of the disclosure, and FIG. 21 is a rear view illustrating a state in which the display is inserted into the housing in the display apparatus of FIG. 17.

As shown in FIGS. 20 and 21, the display apparatus 1 may include a lifting device 700 configured to raise and lower the display 200 to allow the display 200 to protrude out from the housing 100.

The lifting device 700 may include a first arm 710 and a second arm 720 configured to move the display 200 in the up and down direction.

The lifting device 700 may include a first drive 730 configured to drive the first arm 710 and a second driver 740 configured to drive the second arm 720.

The first arm 710 may be disposed adjacent to the first end 231 of the cap 230, and the second arm 720 may be disposed adjacent to the second end 232 of the cap 230. Accordingly, the cap 230 may be supported in the left and right directions, and the cap 230 may be moved in the up and down direction by the first and second arms 710 and 720, and accordingly, the display 200 may be moved in the up and down direction.

Upper ends of the first and second arms 710 and 720 may be provided to be coupled to the cap 230, respectively. The first and second arms 710 and 720 may be provided as telescopic arms each including a plurality of segments 711 and 721.

The plurality of segments 711 and 712 may be provided as cylinders having different diameters. As the segments 711 and 721 are overlapped, a length of the first and second arms 710 and 720 may be reduced. As the segments 711 and 721 are extended, a length of the first and second arms 710 and 720 may be increased.

In response to overlapping the plurality of segments 711 and 721, the first and second arms 710 and 720 may have a minimum length. A state in which the first and second arms 710 and 720 have the minimum length may be defined as a first state 700A. In response to the first state 700A of the first and second arms 710 and 720, the display 200 may be inserted into the housing 100.

As the plurality of segments 711 and 721 in an overlapped state is extended outward, the length of the first and second arms 710 and 720 may be increased. The cap 230 connected to the upper end of the first and second arms 710, and 720 may be linked to the extension of the length of the first and second arms 710 and 720 and thus the cap 230 may protrude to the outside of the housing 100.

The other ends of the first and second arms 710 and 720 may be fixed to the inside of the housing 100. Accordingly, as the lengths of the first and second arms 710 and 720 are increased, the first and second arms 710 and 720 may be extended upward, and accordingly, the display 200 may be moved upward.

When a state, in which the first and second arms 710 and 720 have a maximum length, is defined as a second state 700B, the display 200 may protrude from the housing 100 until the first and second arms 710 and 720 become the second state 700B.

In response to the second state 700B of the first and second arms 710 and 720, the display 200 may be disposed at a position in which the display 200 maximally protrudes from the housing 100.

During the first and second arms 710 and 720 are extended from the first state 700A to the second state 700B, the display 200 in a state of being inserted in the housing 100 may protrude outward from the housing 100.

Conversely, during the first and second arms 710 and 720 are reduced from the second state 700B to the first state 700A, the display 200 may be gradually inserted to the housing 100 from the state of protruding outward from the housing 100.

The first and second arms 710 and 720 may be extended or contracted by the first driver 730 and the second driver 740, respectively.

The first and second drivers 730 and 740 may transmit power to the first and second arms 710 and 720 by including a power generation component, such as a motor. The first and second arms 710 and 720 may be extended or contracted by receiving the power from the first and second drivers 730 and 740 and converting the power.

However, the disclosure is not limited thereto, and the lifting device 700 may transmit a driving force to the first and second arms 710 and 720 through a single driver.

The first and second drivers 730 and 740 may allow the first and second arms 710 and 720 to be extended at the same speed during the first and second arms 710 and 720 reaches the second state 700B from the first state 700A. Accordingly, the cap 230 coupled to the first and second arms 710 and 720 may be raised horizontally in the left and right direction.

Conversely, the first and second drivers 730 and 740 may allow the first and second arms 710 and 720 to be contracted at the same speed during the first and second arms 710 and 720 reaches the first state 700A from the second state 700B. Accordingly, the cap 230 coupled to the first and second arms 710 and 720 may be lowered horizontally in the left and right direction.

Hereinafter driving of the lifting device 300 in response to a malfunction occurring in the lifting device 300 caused by an external force generated when the display 200 is raised and lowered, will be described in detail.

Figure 22:
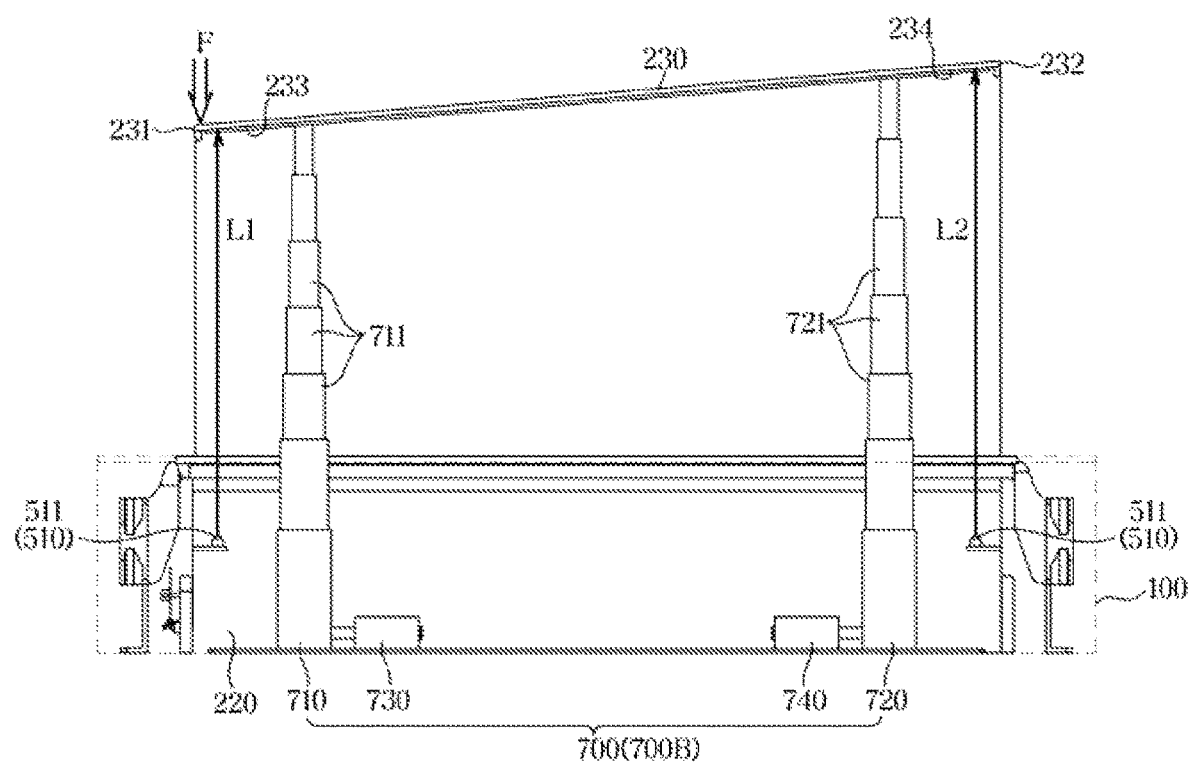
FIG. 22 is a view illustrating a state in which the display has a malfunction in the display apparatus of FIG. 20.

FIG. 22 is a view illustrating a state in which the display has a malfunction in the display apparatus of FIG. 20.

Due to an external force generated in a part adjacent to any one of the first end 231 and the second end 232, the cap 230 may be raised in a non-horizontal state in the left and right direction. Because stress is generated in the display 200, the display panel 210 may be damaged or the lifting device 300 may be damaged.

The controller 20 may control the first driver 730 or the second driver 740 independently of each other in response to the display 200 being raised in the non-horizontal state due to an external force. Therefore, the controller 20 may control the lifting device 700 to raise the display 200 horizontally.

As shown in FIG. 22, in response to an external force F being generated downward in a part adjacent to the first end 231, a large amount of external force F may be generated in the first arm 710 between the first and second arms 710 and 720 that is raised and lowered. Therefore, the first and second arms 710 and 720 may be raised to different heights L1 and L2, respectively.

A raising height L1 of the first arm 710 detected by the first position sensor 511 adjacent to the position, to which the external force F is applied, and a raising height L2 of the second arm 720 detected by the second position sensor 512 disposed opposite to the first position sensor 511 may be sensed as different values.

The first and second position sensors 511 and 512 may transmit the sensed values to the controller 20, respectively.

The controller 20 may drive the lifting device 700 to be raised or lowered, and in response to receiving the different sensed values, the controller 20 may control the first driver 730 or the second driver 740 to make the received sensed values the same.

In response to a sensed value L1, which is transmitted from the first position sensor 511, being less than a sensed value L2 transmitted from the second position sensor 512 in a raising state of the lifting device 700, the controller 20 may control the second driver 740 to allow the second arm 720 to be raised while maintaining the same height as the first arm 710.

According to one or more embodiments, the lifting device 700 may include the plurality of drivers 730 and 740 configured to drive the first and second arms 710 and 720 independently of each other. Accordingly, the controller 20 may control the drivers 730 and 740 independently of each other.

As mentioned above, in response to receiving the different sensed values transmitted from the first and second position sensor 511 and 512, the controller 20 may control one of the first and second drivers 730 and 740.

However, the disclosure is not limited thereto, and in response to sensed values, which are transmitted from the first and second position sensors 511 and 512, being different from a predetermined value, the controller 20 may control the first and second drivers 730 and 740 independently of each other to allow the first and second position sensor 511 and 512 to sense the same value as the predetermined value.

Hereinafter a display apparatus 1 according to one or more embodiments of the disclosure will be described. Configurations other than a discharge device 800 described below are the same as those of the display apparatus 1 according to one or more embodiments of the disclosure.

Figure 23:
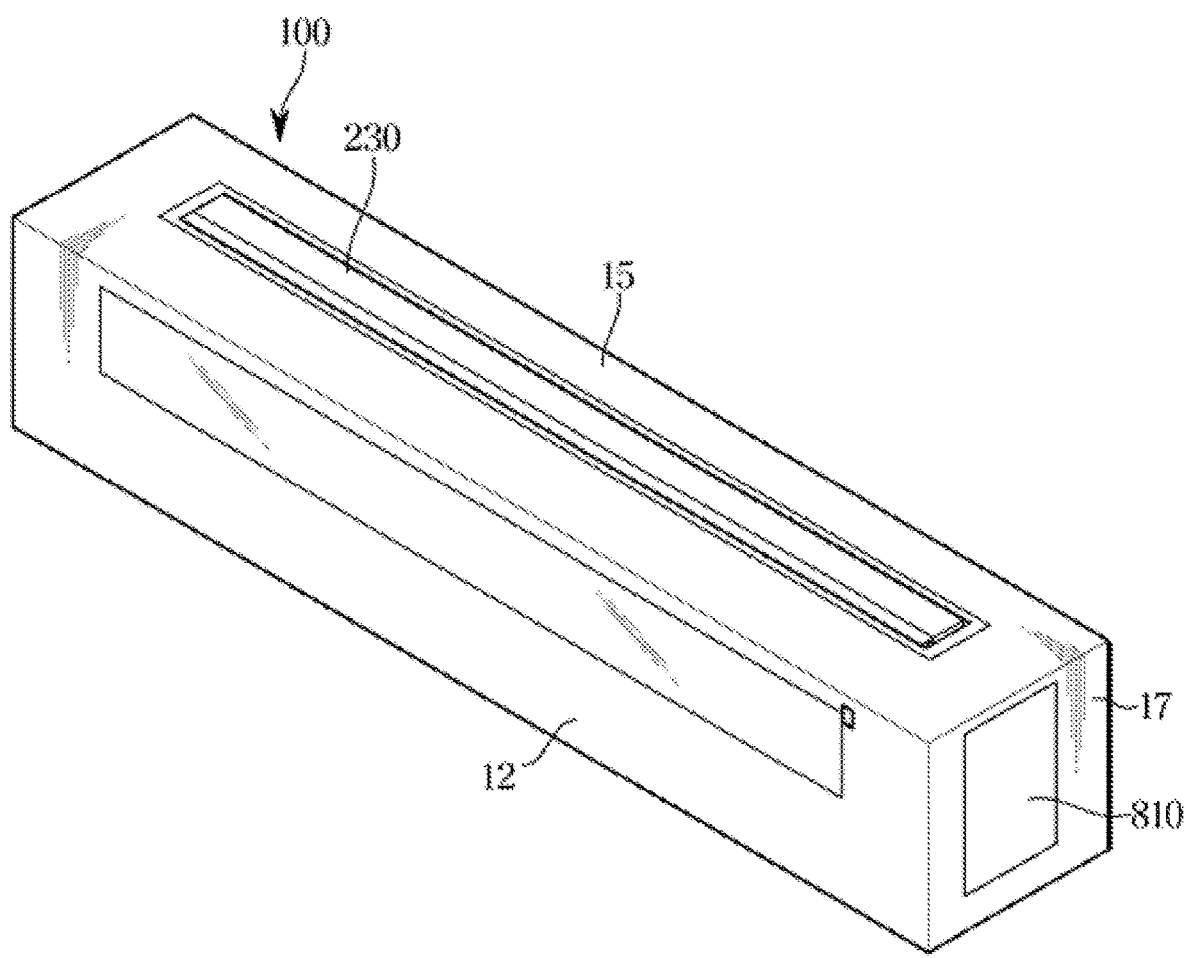
FIG. 23 is a perspective view of a display apparatus according to one or more embodiments of the disclosure.
Figure 24:
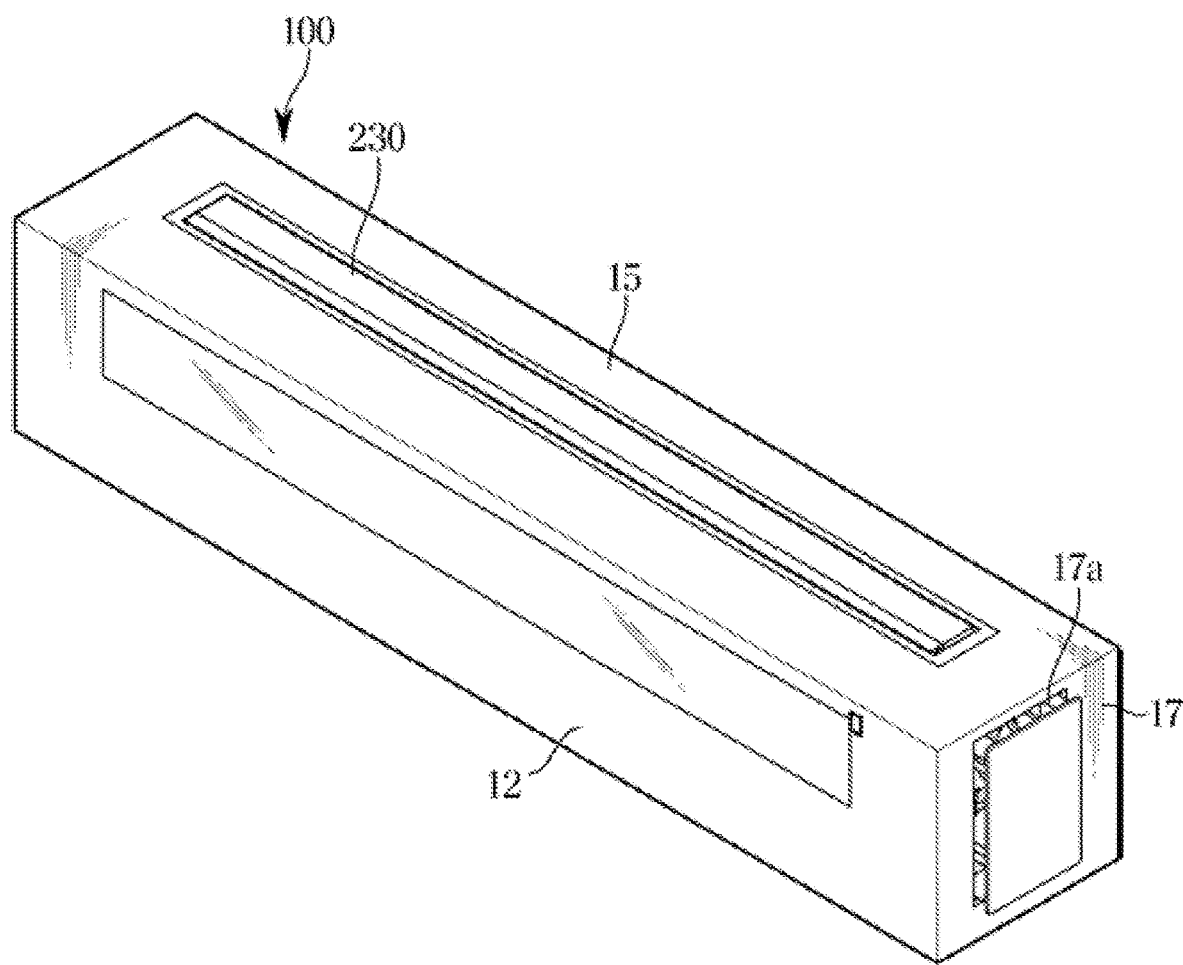
FIG. 24 is a view illustrating a state in which a side surface is opened in the display apparatus of FIG. 23.
Figure 25:
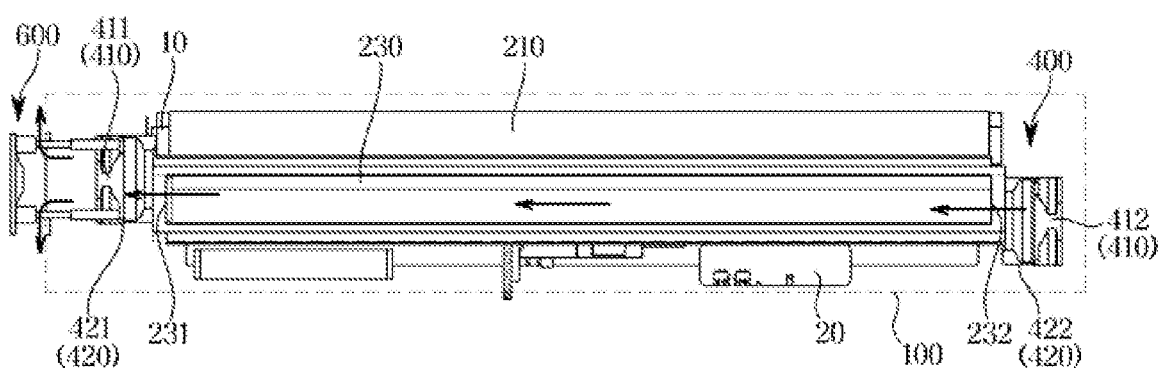
FIG. 25 is a plan view of the display apparatus of FIG. 24.
Figure 26:
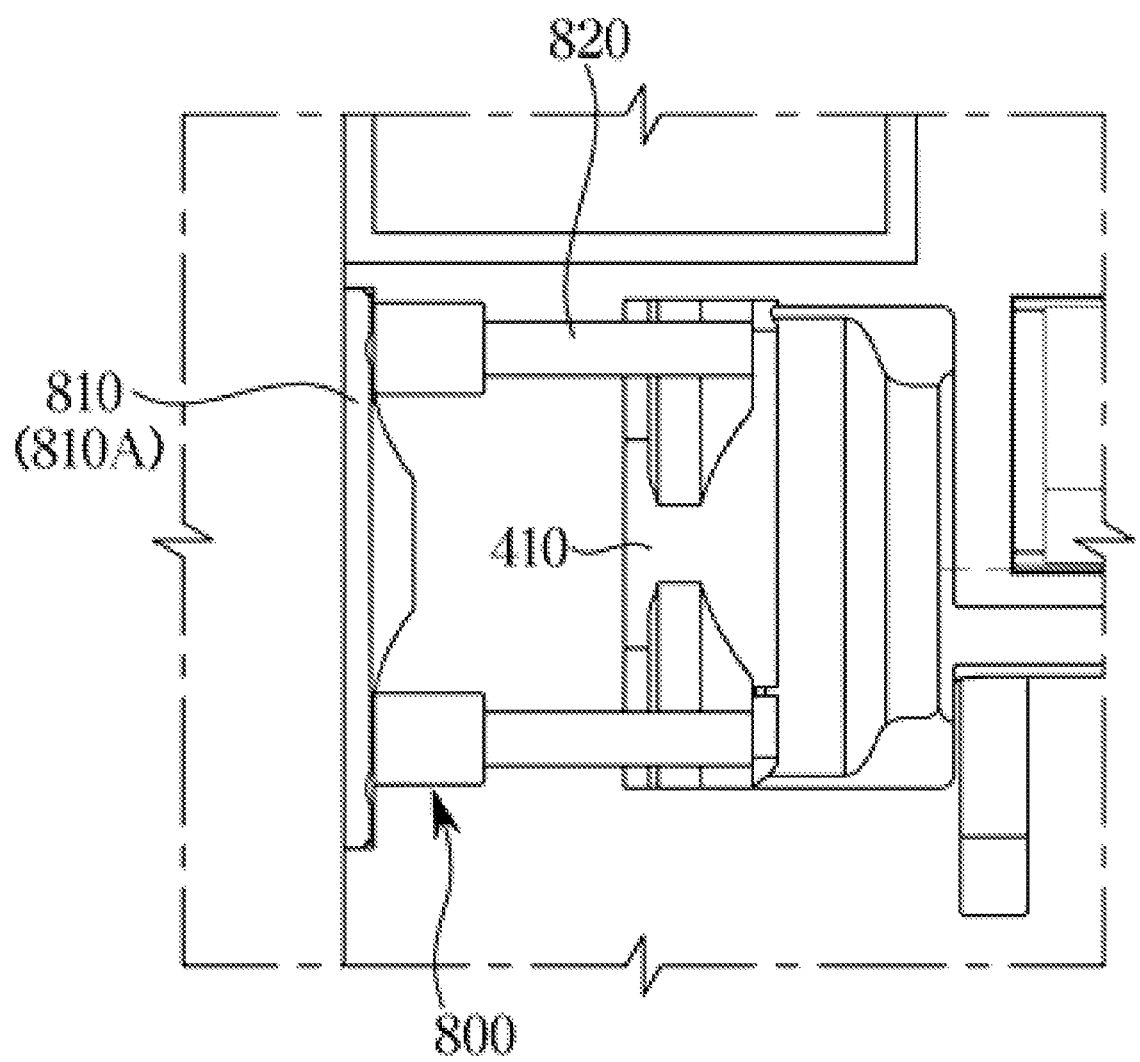
FIG. 26 is a cross-sectional view illustrating one or more configurations in a state in which the side surface is closed in the display apparatus of FIG. 23.
Figure 27:
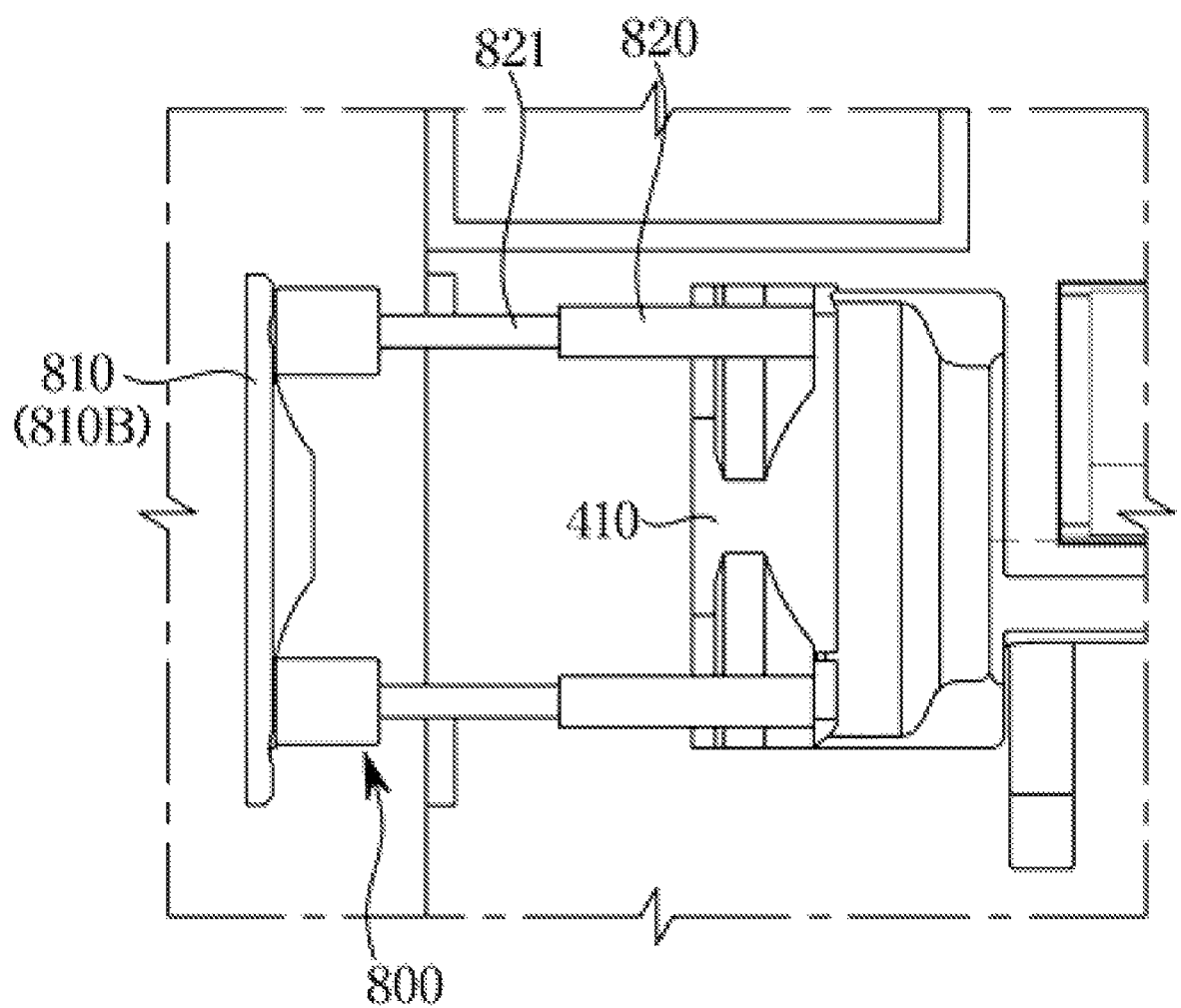
FIG. 27 is a cross-sectional view illustrating one or more configurations in a state in which the side surface is opened in the display apparatus of FIG. 23.

FIG. 23 is a perspective view of a display apparatus according to one or more embodiments of the disclosure, FIG. 24 is a view illustrating a state in which a side surface is opened in the display apparatus of FIG. 23, FIG. 25 is a plan view of the display apparatus of FIG. 24, FIG. 26 is a cross-sectional view illustrating one or more configurations in a state in which the side surface is closed in the display apparatus of FIG. 23, and FIG. 27 is a cross-sectional view illustrating one or more configurations in a state in which the side surface is opened in the display apparatus of FIG. 23.

As illustrated in FIGS. 23 to 25, a display apparatus according to one or more embodiments of the disclosure may include the discharge device 800 configured to discharge foreign substances, which are introduced into the housing 100, to the outside of the housing 100.

As described above, in response to the opening 104 of the housing 100 being opened as the display 200 is raised or lowered, the external foreign substances may be introduced into the housing 100.

Foreign substances may be directly introduced into the opening 104 or foreign substances seated on the display 200 or the lifting device 300 may be introduced into the housing 100 in response to the insertion of the display 200 or the lifting device 300.

Foreign substances may be discharged to the outside of the housing 100 from the opening 104 by the cleaning assembly 400 described above, but some foreign substances may pass through the cleaning assembly 400 and flow into the housing 100.

The discharge device 800 may be configured to discharge foreign substances, which are introduced into the housing 100 through the cleaning assembly 400 as described above, to the outside of the housing 100.

However, the disclosure is not limited thereto. For example, the display apparatus 1 may include only the pair of fans 410 and the discharge device 800 without the cleaning assembly 400.

A side surface 17 of the housing 100 may include a discharge opening 17a provided to communicate with the outside to allow foreign substances to be discharged by the discharge device 800. However, the disclosure is not limited thereto, and the discharge opening 17a may be disposed on the other surface of the housing 100.

It is difficult to discharge the foreign substances, which pass through the cleaning assembly 400 and are introduced into the housing 100, through the opening 104 because the cleaning assembly 400, the display 200, and the lifting device 300 are provided in close contact with each other.

Therefore, the display apparatus 1 according to one or more embodiments of the disclosure may include the discharge opening 17a to discharge foreign substances, which are introduced into the housing 100, through another path.

The discharge device 800 may include a door 810 configured to open and close the discharge opening 17a. The discharge device 800 may selectively open and close the door 810.

In response to the door 810 opened by driving of the discharge device 800, the discharge opening 17a may communicate with the outside, and foreign substances may be discharged to the outside through the discharge opening 17a.

The discharge device 800 may be provided between any one fan 410 of the pair of fans 410 and the discharge opening 17a.

When in the pair of fans 410, a fan 410 adjacent to the first end 231 of the cap 230 is referred to as a first fan 411, and a fan 410 adjacent to the second end 232 of the cap 230 is referred to as a second fan 412, the discharge device 800 may be disposed between the first fan 411 and the discharge opening 17a.

In addition, in the pair of fan housings 420 configured to cover the pair of fans 410, a fan housing 420 configured to cover the first fan 411 may be referred to as a first fan housing 421 and a fan housing 420 configured to cover the second fan 412 may be referred to as a second fan housing 422.

However, the disclosure is not limited thereto, and the discharge device 800 may be disposed between the second fan 412 and the side surface 17. The discharge opening 17a may be provided on the side surface 17 adjacent to the second end 232.

The controller 20 may allow the discharge device 800 and the pair of fans 410 to be driven to foreign substances in the housing 100 to be discharged.

As mentioned above, the pair of fans 410 may be configured to blow air toward the opening 104 of the housing 100.

However, the controller 20 of the display apparatus 1 according to one or more embodiments of the disclosure may drive the first fan 411 to blow air in the direction of the discharge opening 17a in response to driving the discharge device 800.

The second fan housing 422 may include an opening portion configured to open a part of the second fan housing 422 to allow the second fan 412 to directly blow air to the inside of the housing 100 without blowing air through the duct 430.

The first fan housing 421 may include an opening portion configured to allow air, which is blown from the second fan 412, to flow into the inside of the first fan housing 421 and to be discharged to the outside through the first fan 411.

The controller 20 may control the first fan 411 to blow air to the direction of the opening 104 in response to driving of the cleaning assembly 400. In response to driving of the discharge device 800, the controller 20 may control the discharge device 800 to open the door 810, and the controller 20 may control the first fan 411 to blow air to the direction of the discharge opening 107a.

In addition, the controller 20 may open the opening portions of the first and second fan housings 421 and 422 in response to driving of the discharge device 800.

The second fan 412 may blow air in the direction of the opening 104. In a state in which the opening 104 is closed by the cap 230, the blown air may flow in the direction of the first fan 411 through the opening portion.

Accordingly, the first fan 411 and the second fan 412 may blow air in the direction of the discharge opening 107a, and thus, foreign substances introduced into the housing 100 may be discharged to the outside of the housing 100 through the discharge opening 107a.

It may be appreciated that the controller 20 allows the second fan 412 to blow air with a greater output than the first fan 411 in response to driving of the discharge device 800.

As shown in FIGS. 26 and 27, the discharge device 800 may include a support 820 configured to support the door 810 and allow the door 810 to selectively open the discharge opening 107a.

The support 820 may support the door 810 to perform a translational motion between a first position 810A in which the door 810 closes the discharge opening 107a, and a second position 810B in which the door 810 is pressed to the outside of the side surface 107 of the housing 100 to open the discharge opening 107a.

The support 820 may move the door 810 to be translated between the first position 810A and the second position 810B.

The support 820 may include a push rod 821 configured to press the door 810 to be moved from the first position 810A to the second position 810B.

In response to driving of the discharge device 800, the push rod 821 in a state of being inserted into the support 820 may protrude from the support 820 in the direction, in which the side surface 107 of the housing 100 is disposed.

One end of the push rod 821 may be inserted into the support 820 and the other end of the push rod 821 may be coupled to the door 810.

In response to the protrusion of the push rod 821, the other end of the push rod 821 may press the door 810 to the outside of the side surface 107 of the housing 100 while supporting the door 810.

The support 820 may be electrically connected to the controller 20.

The controller 20 may control the support 820 to allow the push rod 821 of the support 820 to protrude.

The controller 20 may control the support 820 to allow the push rod 821 to protrude from the support 820 to open the door 810, and the controller 20 may control the first and second fans 411 and 412 to allow air to flow to the direction of the discharge opening 107a.

The controller 20 may control the support 820 to allow the push rod 821 to reciprocate in response to driving of the first fan 411 and the second fan 412. However, the disclosure is not limited thereto, and in response to driving of the first fan 411 and the second fan 412, the controller 20 may control the support 820 to maintain a state in which the push rod 821 presses the door 810.

As is apparent from the above description, the display apparatus may easily determine whether the display apparatus stably protrudes through sensors configured to sense heights of opposite sides of the display panel configured to protrude.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Embodiments of the disclosure will be described below in more detail with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
   a housing including an opening formed on an upper surface;
   a display configured to protrude out from the housing through the opening along a vertical axis;
   a lifting device configured to raise and to lower the display along the vertical axis with respect to the housing;

a position sensor disposed inside the housing and configured to sense a distance in which an upper portion of the display is moved along the vertical direction, wherein the position sensor comprises a first position sensor and a second position sensor spaced apart along a horizontal axis, a first reflector disposed in the upper portion of the display and disposed at a position corresponding to the first position sensor along the vertical axis, and a second reflector disposed in the upper portion of the display and disposed at a position corresponding to the second position sensor along the vertical axis, wherein the first position sensor and the second position sensor are disposed to correspond to the opening and emit light through the opening, to simultaneously sense a distance by which the display is raised.

2. The display apparatus of claim 1, wherein the first position sensor and the second position sensor are optical sensors.

3. The display apparatus of claim 1, wherein the display further comprises:
a flexible display panel on which a screen is displayed in a first direction perpendicular to vertical axis and the horizontal axis, and
a cap disposed on an upper end of the flexible display panel and configured to support the flexible display panel,
wherein the cap comprises an extension extending in a second direction opposite to the first direction, and
wherein the first and the second reflectors are disposed on the extension.

4. The display apparatus of claim 1, further comprising:
a controller configured to determine an appearance error of the display based on a distance that is obtained by the first position sensor and the second position sensor at predetermined time intervals when the lifting device is driven.

5. The display apparatus of claim 4, wherein the controller obtains a first distance between the first position sensor and the first reflector and a second distance between the second position sensor and the second reflector, and
wherein, based on the first distance and the second distance being different, the controller determines that the appearance error of the display occurs.

6. The display apparatus of claim 5, wherein based on a protruding distance of the display being less than a predetermined length, the controller stops driving of the lifting device and displays a notification about the appearance error of the display.

7. The display apparatus of claim 5, wherein based on a protruding distance of the display being greater than a predetermined length, the controller stops driving of the lifting device.

8. The display apparatus of claim 1, further comprising a limit sensor configured to detect driving of the lifting device, the lifting device comprising:
a driver,
an arm connected to the display to raise and lower the display, and
a drive transmission configured to connect the arm to the driver to transmit a driving force to the arm, wherein the drive transmission is configured to be moved between a first position where the display is moved to be inserted into the housing and a second position where the display is moved to protrude from the housing, wherein the limit sensor is configured to detect the first position or the second position of the drive transmission.

9. The display apparatus of claim 1, further comprising:
a roller arranged in the housing and configured to allow the display to be rolled or unrolled in the housing based on the display being raised or lowered, and
a rotation sensor arranged in the housing and configured to sense a rotation of the roller.

10. The display apparatus of claim 9, further comprising a controller configured to control the lifting device based on a value sensed by the rotation sensor.

11. The display apparatus of claim 10, wherein the lifting device is configured to lower the display based on a value sensed by the rotation sensor based on the display being raised by the lifting device wherein the sensed value is different from a predetermined value input to the controller.

12. The display apparatus of claim 10, further comprising a limit sensor configured to determine whether a protruding length of the display corresponds to a predetermined length and configured to detect a third position between the first position and the second position of the drive transmission.

13. The display apparatus of claim 12, wherein based on the protruding length of the display reaching the predetermined length, the controller stops driving of the lifting device and displays a notification about the appearance error of the display.

14. The display apparatus of claim 13, wherein based on detecting the third position by the limit sensor, the controller determines that the protruding length of the display reaches the predetermined length.

15. The display apparatus of claim 12, wherein based on the protruding distance of the display being greater than the predetermined length, the controller stops driving of the lifting device.

16. The display apparatus of claim 1, further comprising:
a dust collection sensor configured to detect foreign substances introduced from outside the display apparatus; and
a controller configured to drive a cleaning assembly based on detecting the foreign substances by the dust collection sensor.

17. The display apparatus of claim 16, wherein the controller controls a fan to be driven according to a cycle of operating times of the lifting device.

18. The display apparatus of claim 16, wherein the controller controls a fan to be driven based on an off-state of the display.

19. A display apparatus comprising:
a housing including an opening formed on an upper surface;
a roller arranged inside the housing;
a display configured to be rolled or unrolled by the roller;
a lifting device configured to be linked to the roller to raise the display to protrude out from the housing through an opening along a vertical axis;
a position sensor disposed inside the housing, and configured to sense a distance in which an upper portion of the display is moved along the vertical axis, wherein the position sensor comprises a first position sensor and a second position sensor spaced apart along a horizontal axis,
a first reflector disposed in the upper portion of the display and disposed at a position corresponding to the first position sensor along the vertical axis, and a second reflector disposed in the upper portion of the display and disposed at a position corresponding to the second position sensor along the vertical axis, wherein the first position sensor and the second position sensor are disposed to correspond to the opening and emit light through the opening, to simultaneously sense a distance by which the display is raised.

\* \* \* \* \*